United States Patent [19]

Yamanobe et al.

[11] Patent Number: 4,814,792
[45] Date of Patent: Mar. 21, 1989

[54] LATERAL REGISTRATION ADJUSTING DEVICE FOR USE IN A LASER BEAM PRINTER

[75] Inventors: Koji Yamanobe, Tokyo; Shigeru Yamazaki, Tanashi; Hidetake Tanaka, Tokyo, all of Japan

[73] Assignee: Ricoh Company, Ltd., Tokyo, Japan

[21] Appl. No.: 173,451

[22] Filed: Mar. 25, 1988

[30] Foreign Application Priority Data

Mar. 25, 1987 [JP] Japan .................................. 62-71114

[51] Int. Cl.$^4$ .............................................. G01D 9/42
[52] U.S. Cl. .................................... 346/108; 358/296
[58] Field of Search ............... 346/108, 160; 358/296; 355/3 SH, 14 SH

[56] References Cited

U.S. PATENT DOCUMENTS 4,712,118 12/1987 Seto ..................................... 346/108
4,763,241 8/1988 Egawa ................................. 346/154

Primary Examiner—E. A. Goldberg
Assistant Examiner—Mark Reinhart
Attorney, Agent, or Firm—Cooper & Dunham

[57] ABSTRACT

A lateral registration adjusting device for use in an optical writing system, such as a laser beam printer, is provided. When a sheet of recording paper has arrived at a registration roller which is driven to rotate intermittently in association with the rotation of a photosensitive drum, a discrepancy between the sheet of recording paper and a reference position in the lateral direction transverse to the direction of transportation of the sheet of recording paper is detected. Based on this information of lateral discrepancy, the writing start position for writing an image on the photosensitive drum in a scan line is adjusted such that the lateral discrepancy is absorbed. Thus, when the image is formed on the drum and then transferred onto the sheet of recording paper, there is obtained a predetermined relative positional relationship between the sheet of recording paper and the image in the lateral direction at all times.

2 Claims, 27 Drawing Sheets

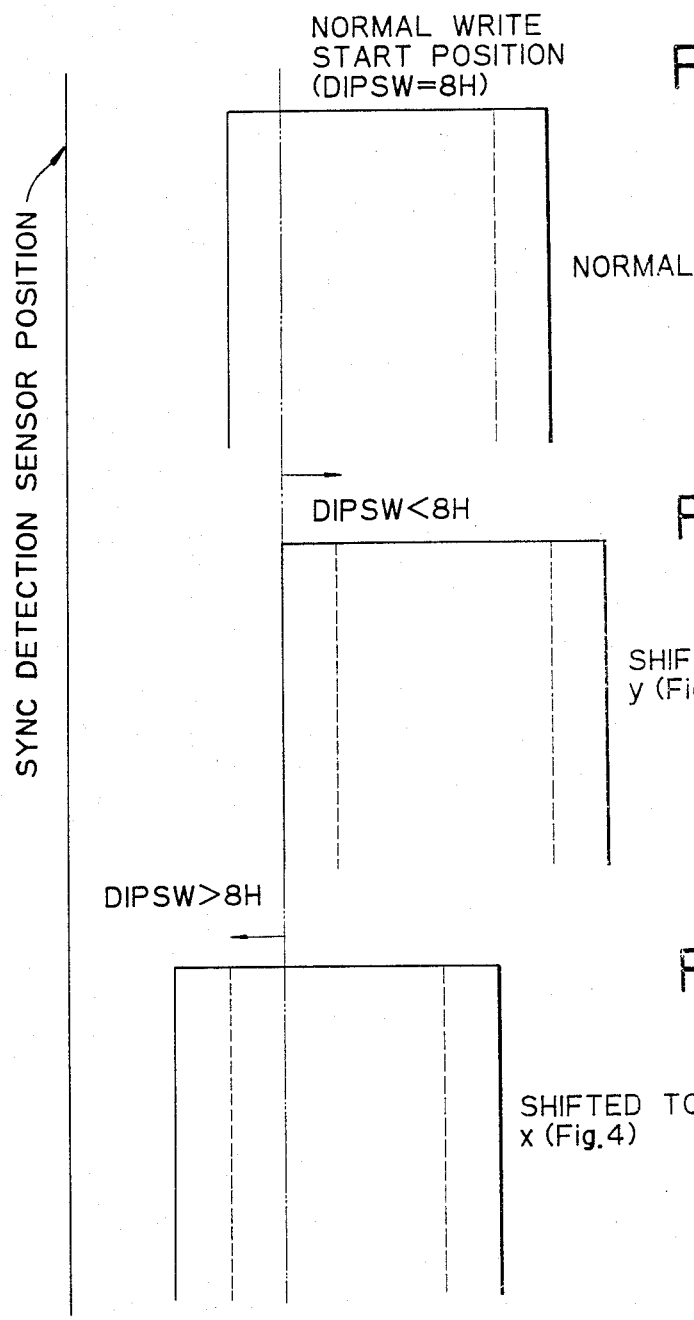

| Fig.6A | Fig.6B |

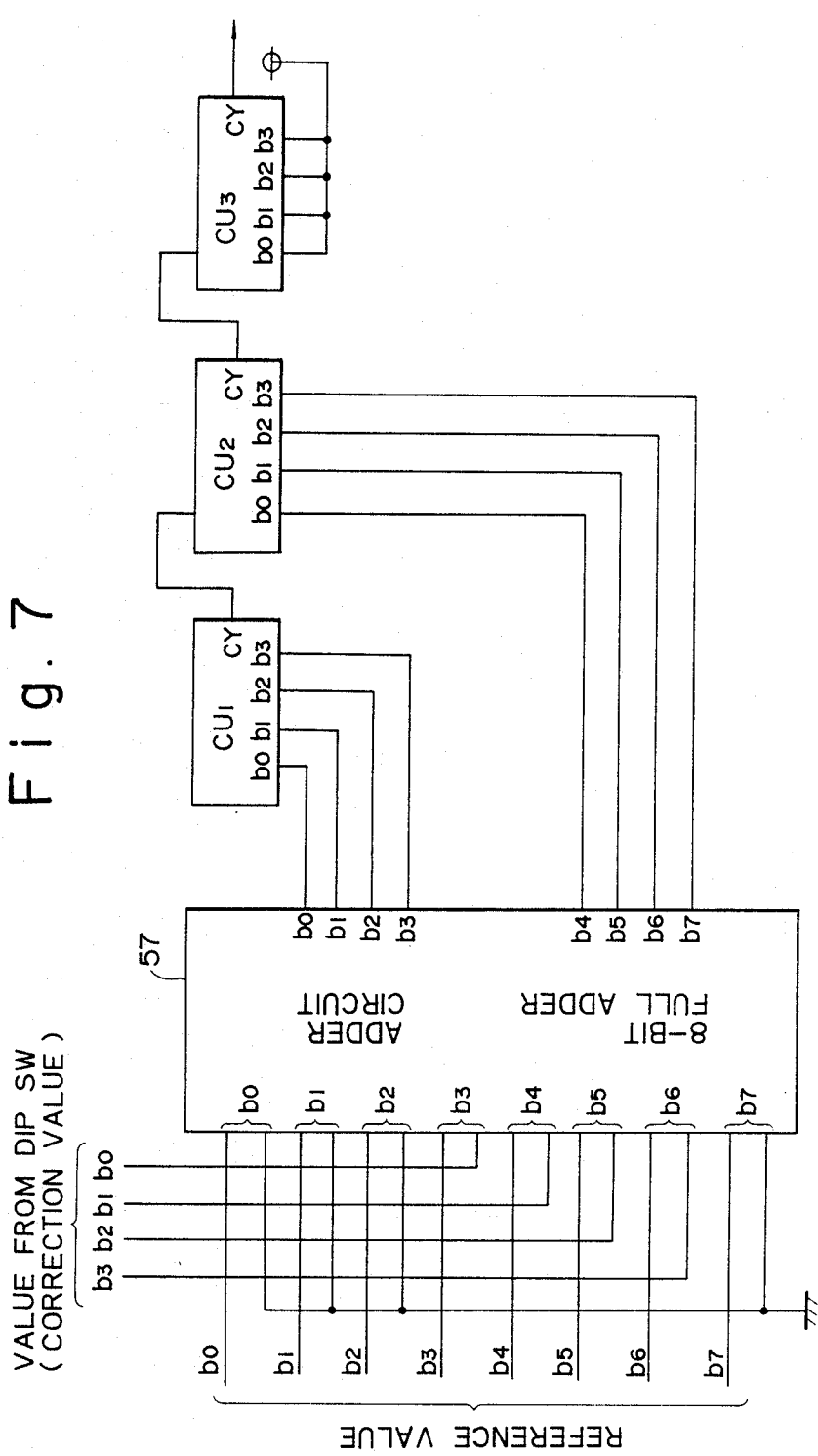

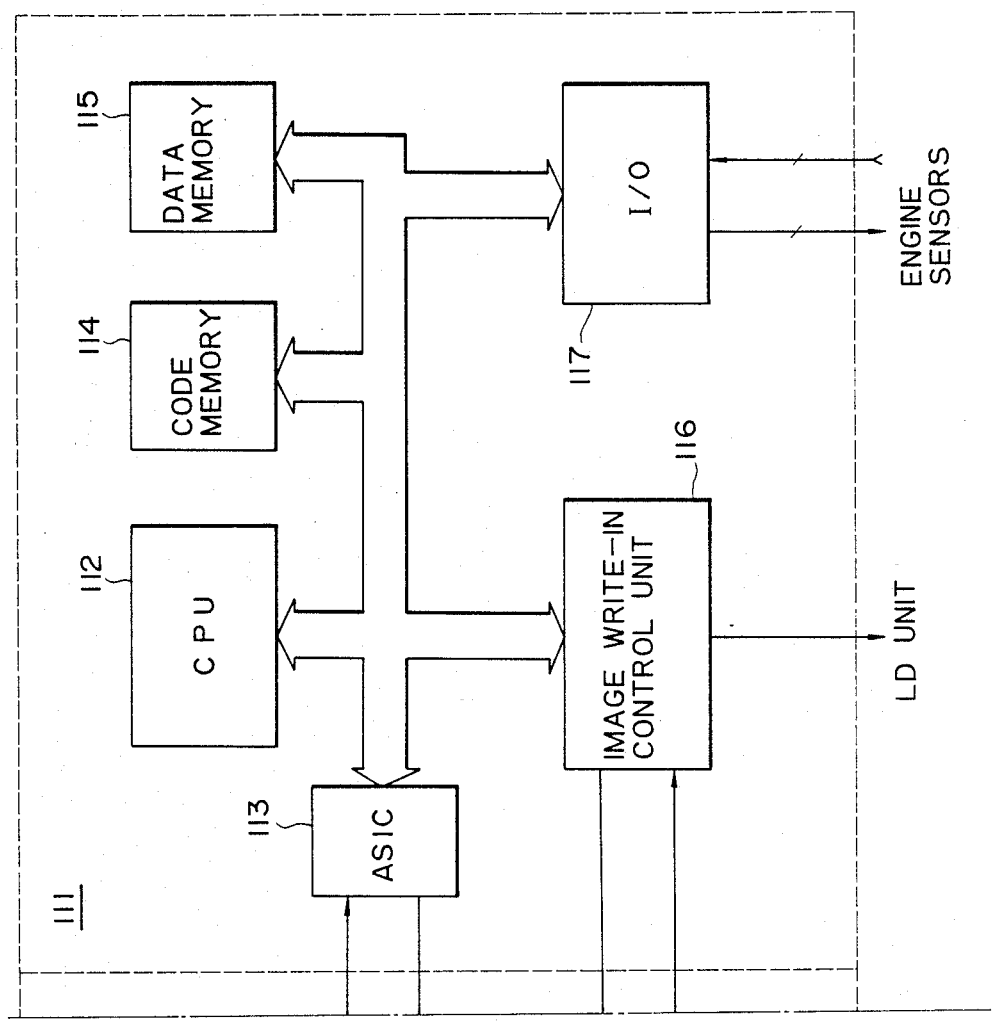

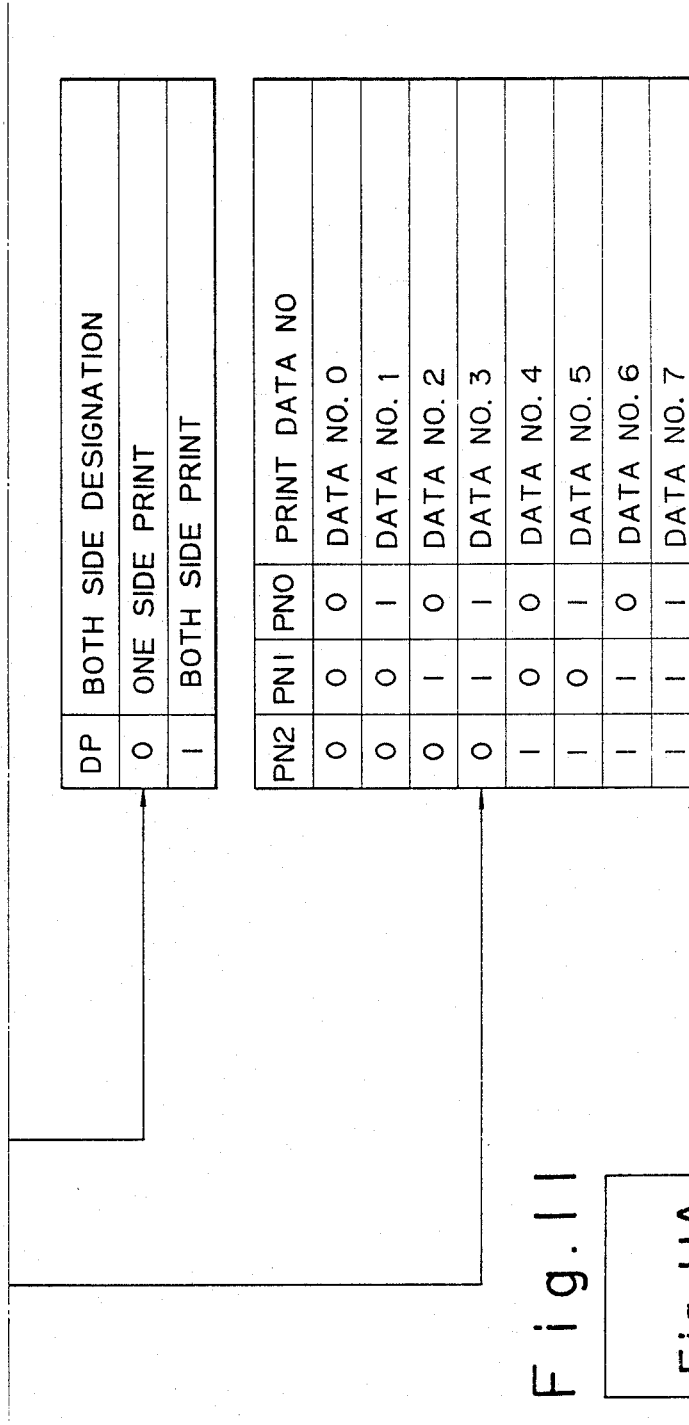

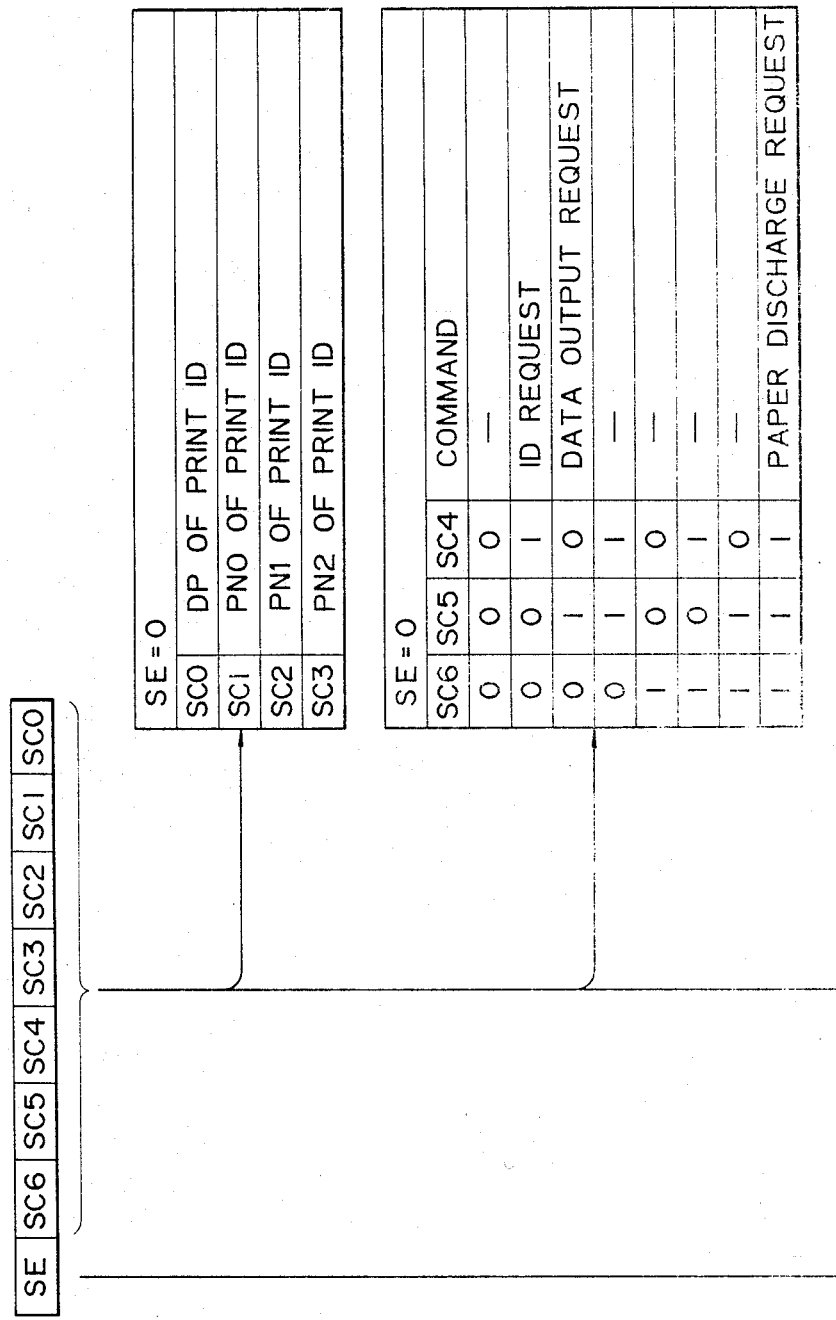

| Fig.12A | Fig.12B |

LATERAL REGISTRATION ADJUSTING DEVICE FOR USE IN A LASER BEAM PRINTER

BACKGROUND OF THE INVENTION

1. Field of the Invention

This invention generally relates to a registration adjusting device for use in an optical writing system, such as a laser beam printer, for adjusting a registration between a scanning light beam and a sheet of recording paper and in particular to a lateral registration adjusting device for adjusting a registration between a scanning light beam and a sheet of recording paper in a lateral direction which is perpendicular to the direction of transportation of the sheet of recording paper.

2. Description of the Prior Art

In a prior art optical scanning writing system, such as a laser beam printer, typically a plurality of paper cassettes storing sheets of recording paper different in size are provided. And, a sheet of recording paper from the selected paper cassette is first transported to a registration roller which is located near the entrance to an image transfer station where an image is transferred to a sheet of recording paper from a rotating photosensitive drum. The sheet of recording paper in transportation is temporarily brought to a halt when its leading edge has come into abutment against the registration roller which is normally kept inoperative and driven to rotate intermittently. In association with the rotation of the photosensitive drum, the registration roller is driven to rotate to thereby cause the sheet of recording paper to advance into the image transfer station.

With such a structure, the registration in the transporting direction, i.e., auxiliary scanning direction, between the image to be transferred from the photosensitive member and a sheet of recording paper to which the image is to be transferred can be obtained at a relatively high accuracy. Thus, the leading edge of the image is located at a desired position on the sheet of recording paper when transferred. However, in the above-described structure, since sheets of recording paper are supplied from different paper cassettes at different locations, there may still be a chance that each sheet of recording paper coming into contact with the registration roller is shifted in the lateral direction (i.e., transverse direction with respect to the paper transportation direction) one from another. If there is such a discrepancy in the lateral direction between the scanning light beam and a sheet of recording paper, there may be a chance that the image transferred is located too close to one lateral edge of the sheet of recording paper or even beyond the lateral edge in an extreme case.

The typical prior art approach is to provide a mechanical alignment mechanism which brings a sheet of recording paper in registration with its lateral direction before the sheet of recording paper comes into abutment against the registration roller. However, such a mechanical lateral registration mechanism suffers from other disadvantages, such as slowdown in processing speed, high cost and difficulty in maintenance.

SUMMARY OF THE INVENTION

In accordance with the principle of the present invention, there is provided a lateral registration adjusting device suitable for use in a scanning type optical writing system, such as a laser beam printer, in which the lateral registration between an image to be transferred from an imaging means and a sheet of recording paper is electrically or electronically adjusted. In particular, the registration between a scanning light beam and a sheet of recording paper is suitably adjusted. That is, the start point for starting optical writing of an image on the imaging means in the optical scanning direction (also often referred to as the main scanning direction) is suitably adjusted depending on the lateral location of a sheet of recording paper with respect to a reference location. Typically, the imaging means includes a photosensitive drum which is driven to rotate in a predetermined direction at constant. Thus, in accordance with the principle of the present invention, the lateral location of an image on the photosensitive drum is determined in accordance with the information regarding the lateral position of a sheet of recording paper being transported.

It is therefore a primary object of the present invention to obviate the disadvantages of the prior art as described above and to provide an improved lateral registration adjusting device for adjusting a lateral position of an image to be formed in accordance with the information regarding the lateral position of a sheet of recording paper.

Another object of the present invention is to provide an improved lateral registration adjusting device suitable for use in a scanning type optical writing system, such as a laser beam printer.

A further object of the present invention is to provide an improved lateral registration adjusting device accurate, fast and reliable in operation, low at cost and easy in maintenance.

A still further object of the present invention is to provide an improved lateral registration adjusting device capable of effecting registration adjustments electrically or electronically and not mechanically.

Other objects, advantages and novel features of the present invention will become apparent from the following detailed description of the invention when considered in conjunction with the accompanying drawings.

BRIEF DESCRIPTION OF THE DRAWINGS

FIGS. 5a through 5c are illustrations which are useful for understanding the principle of the present invention;

FIG. 7 is a block diagram showing the detailed structure of the connection between an adder circuit and a preset counter;

FIG. 9 is an, illustration showing how to combine FIGS. 9A and 9B;

FIGS. 9A and 9B, when combined as shown in FIG. 9, define a block diagram showing the structure of an image processing controller and an engine driver of an image forming system, such as a laser beam printer, constructed in accordance with a further embodiment of the present invention;

FIG. 11 is an illustration showing how to combine FIGS. 11A and 11B;

FIGS. 11A and 11B, when combined as shown in FIG. 11, define an illustration which is useful for understanding the operation of the structure shown in FIGS. 9A and 9B;

FIG. 12 is an illustration showing how to combine FIGS. 12A and 12B;

FIGS. 12A and 12B, when combined as shown in FIG. 12, define an illustration which is also useful for understanding the operation of the structure shown in FIGS. 12A and 12B.

DESCRIPTION OF THE PREFERRED EMBODIMENTS

When a sheet of recording paper is fed from a paper feeding unit, it travels along a predetermined transportation path until it comes into abutment against a registration roller which normally remains unrotational and is driven to rotate intermittently in association with the rotation of a photosensitive drum. When the sheet of recording paper has come into abutment against the registration roller, it is halted temporarily and then is transported into an image transfer station when the registration roller is driven to rotate in synchronism with the rotation of the photosensitive drum. In this manner, sheets of recording paper are brought into abutment against the registration roller one after another. For various reasons, the lateral location differs from sheet to sheet when the sheets of recording paper are brought into contact with the registration roller one after another. In accordance with the principle of the present invention, the lateral location of a sheet of recording paper with respect to a predetermined reference position is detected and the start point for starting optical writing in a scan line is suitably adjusted in accordance with the detected discrepancy so as to obtain a proper registration between an image and a sheet of recording paper at all times.

That is, in accordance with the principle of the present invention, the amount of shift in location of a sheet of recording paper in the lateral direction, which is normal to the direction of transportation of a sheet of recording paper, with respect to a predetermined reference position is detected. Then, in order to eliminate a discrepancy in position between the sheet of recording paper and an image to be transferred thereto, a correction value is set by a correction value setting means in accordance with the detected amount of shift. A counter means is provided and it initiates counting in synchronism with a sync detection pulse, and under normal condition when it has reached a predetermined reference value, the optical writing along a scan line is initiated. If a shift of the sheet of recording paper has been detected, the predetermined reference value is corrected suitably by the correction value set by the correction value setting means. In this manner, a discrepancy in position in the lateral direction between a sheet of recording paper and a predetermined reference position may be suitably absorbed.

Figure 2:
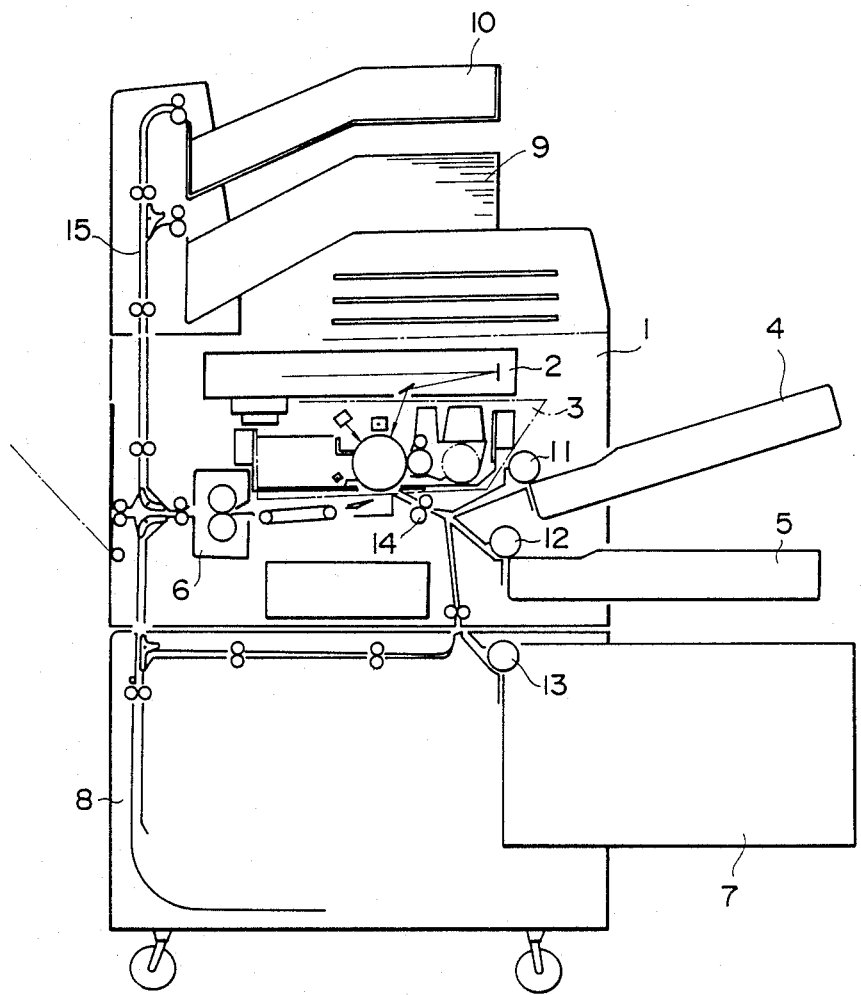
FIG. 2 is a schematic illustration showing the overall structure of a laser beam printer having a plurality of paper feeding units to which the present invention may be advantageously applied.

Now, referring to FIG. 2, there is schematically shown a laser beam printer to which the present invention may be advantageously applied. As shown, the laser beam printer includes a printer main body 1 which is provided with an optical writing unit 2 for optically scanning a photosensitive drum to form an image thereon, an image processing unit 3 including a developing unit, a photosensitive unit, a charging unit, etc., a pair of first and second paper cassettes 4 and 5, and an image fixing unit 6 for causing a toner image transferred to a sheet of recording paper at the image processing unit 3 permanently fixed thereto by application of heat and pressure. Above the printer main body 1 is disposed a pair of first paper discharge tray 9 and second paper discharge tray 10 one above the other, to either one of which a sheet of recording paper is discharged through a discharge transportation path 15 which extends vertically upward from the exit of the image fixing unit 6.

In the illustrated embodiment, the printer main body 1 is mounted on an optional unit which includes a separate large quantity paper feed unit 7 and a paper inversion unit 8 for receiving a sheet of recording paper having its one side recorded from the image fixing unit 6 and supplying it again to the image processing unit 3 upside down. At the supply ends of the first paper cassette 4, the second paper cassette 5 and the large quantity paper feed unit 7 are disposed pick-up rollers 11, 12 and 13, respectively, for feeding sheets of recording paper one by one. In addition, a registration roller 14 for obtaining a positional alignment between an image on the photosensitive drum of the image processing unit 3 and a sheet of recording paper in the transporting direction is disposed upstream of the photosensitive drum with respect to the direction of movement of a sheet of recording paper.

Figure 3:
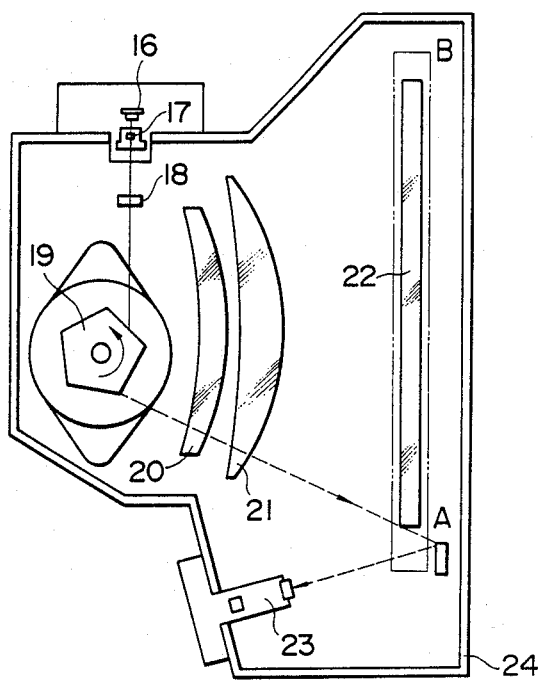
FIG. 3 is a schematic illustration showing the structure of an optical writing unit provided in the laser beam printer of FIG. 2.

FIG. 3 illustrates the structure of the optical writing unit 2 provided in the laser beam printer of FIG. 2. The optical writing unit 2 includes a laser diode 16 for emitting a laser beam, a collimator lens 17 for collimating the laser beam emitted from the laser diode 16, a cylindrical lens 18, a polygon mirror 19 for deflecting the laser beam over a predetermined angle repetitively, a pair of F$\theta$ lenses 20 and 21 for correcting the direction of the laser beam such that the laser beam scans across the width of the photosensitive drum substantially linearly, a mirror 22 for reflecting the laser beam downward toward the photosensitive drum, a sync detection sensor 23 for detecting the timing of initiation of each scanning by the laser beam, and an optical housing 24 for housing the above-mentioned optical elements in a light-tight condition.

Now, the operation of the laser beam printer shown in FIG. 2 will be described below. The laser beam printer receives character codes or the like transmitted from a computer, word processor or the like and the character codes or the like thus received are converted into video signals of corresponding dot patterns by a controller (character generator), which are used for recording an image while controlling various components of the printer main body 1. Each of the first and second paper cassettes 4 and 5 and the large quantity paper feed unit 7 stores a quantity of sheets of recording paper of a preselected size. One of the pick-up rollers 11, 12 and 13 associated with the respective paper cassettes 4 and 5 and large quantity paper feed unit 7 is selectively driven in response to a paper start signal, so that a sheet of recording paper is fed from the selected one of the cassettes 4 and 5 and the paper feed unit 7. And, when the leading edge of the thus fed sheet of recording paper has reached the registration roller 14 after moving past a registration sensor, the leading edge of the sheet of recording paper is lightly pushed against the registration roller 14 to thereby correct the skew, if any, and the selected one of the pick-up rollers 11, 12 and 13 is again stopped temporarily. After correction of the possible skew, the selected one of the pick-up rollers 11, 12 and 13 is again driven to rotate and the registration roller 14 is also driven to rotate so that the sheet of recording paper is transported into an image transfer station of the image processing unit 3.

In this manner, a sheet of recording paper supplied from one of the first and second paper cassettes 4 and 5 and the large quantity paper feed unit 7 or the paper inversion unit 8 is temporarily stopped by the registration roller 14 and the transportation of the sheet of recording paper resumes when the registration roller 14 is again driven to rotate in association with the rotation of the photosensitive drum, so that the timing of supplying of the sheet of recording paper from the registration roller 14 toward the image transfer station is suitably adjusted in the direction of transportation of the sheet of recording paper. As a result, the relative positional relation between an image on the photosensitive drum and the sheet of recording paper in the direction of transportation of the sheet of recording paper is suitably adjusted so that the image on the photosensitive drum may be properly transferred to the sheet of recording paper in proper positional alignment in the direction of transportation of the sheet of recording paper.

On the other hand, in the lateral direction which is a transverse direction with respect to the direction of transportation of a sheet of recording paper and thus corresponds to the optical (or main) scanning direction, an automatic adjusting means for automatically adjusting the relative positional relation between an image to be transferred and a sheet of recording paper is not provided. However, as a sheet of recording paper is transported from either one of the paper cassettes 4 and 5 and the large quantity paper feed unit 7 to the registration roller 14, the sheet of recording paper may be shifted in position in the lateral direction. In particular, if a sheet of recording paper has moved along a path including the paper inversion unit 8, such a shift in position may be increased. In a double side recording mode, in which after recording one side of a sheet of recording paper, the other side is also recorded, a sheet of recording paper which has moved through the image fixing unit 6 is supplied into the paper inversion unit 8 where the sheet of recording paper is turned upside down and the thus turned sheet of recording paper is again transported toward the registration roller 14. Since the paper inversion transportation path is relatively long, the sheet of recording paper is very likely to be shifted in position in the lateral or transverse direction.

The amount of shifting of such a sheet of recording paper depends on the inclination and structural peculiarity of each of the paper cassettes 4 and 5, the large quantity paper feed unit 7 and the paper inversion unit 8. If there were such a shift in position in the lateral direction, the relative positional relationship between the photosensitive drum and a sheet of recording paper is altered so that an image on the photosensitive drum is transferred to the sheet of recording paper with a lateral shift in position. Such a positional shift is closely related to the nature of an individual machine, so that machines must be adjusted individually at high accuracy. In general, such adjustments require mechanical adjustments of the paper transportation path; however, such mechanical adjustments require extensive labor and time. On the other hand, in accordance with the illustrated embodiment of the present invention, the relative positional relationship between an image on the photosensitive drum and a sheet of recording paper is adjusted electrically or electronically as will be described below, so that the required adjustments may be carried out automatically and accurately.

In the optical writing unit 2, in accordance with a video signal synchronized with control timing supplied from the controller, the laser diode 16 is turned on and off to thereby control the emission of light from the laser diode 16. The laser beam thus emitted passes through the lenses 17 and 18 to impinge upon the polygon mirror 19 which rotates counterclockwise and thus the laser beam is deflected over a predetermined angle as the polygon mirror 10 rotates. The deflected laser beam passes through the $f\theta$ lenses 20 and 21. Then the laser beam moves along a reflecting mirror 22 from one end A to the other end B and thus the laser beam is directed toward the photosensitive drum, e.g., OPC drum. As result, the laser beam scans across the width of the photosensitive drum of the image processing unit, which is previously charged to a predetermined polarity uniformly. Since the laser beam is turned on and off in accordance with an image signal to be recorded, the uniform charge on the photosensitive drum is selectively dissipated to thereby form an electrostatic latent image thereon as the laser beam scans across the photosensitive drum in the widthwise direction repetitively.

The latent image thus formed is then developed by a developing device of the image processing unit 3 to thereby form a toner image which is then transferred to a sheet of recording paper at the image transfer station of the image processing unit 3. Then, the sheet of recording paper carrying thereon the thus transferred toner image is transported past the image fixing unit 6 to thereby have the transferred toner image permanently fixed to the sheet of recording paper. The sheet of recording paper moving past the image fixing unit 6 is transported substantially horizontally to be discharged onto a paper discharge tray indicated by the one-dotted line if a face-up paper discharge mode, in which a sheet of recording paper is discharged with its printed side facing upward, has been selected. On the other hand, if a face-down paper discharge mode has been selected, the sheet of recording paper passing through the image fixing unit 6 is transported through the paper discharge path 15 to be discharged onto a selected one of the pair of first and second paper discharge trays 9 and 10.

Next, a lateral registration adjusting device constructed in accordance with one embodiment of the present invention as applied to a laser beam printer having a plurality of paper feed units as described above will be described in detail below.

Figure 4:
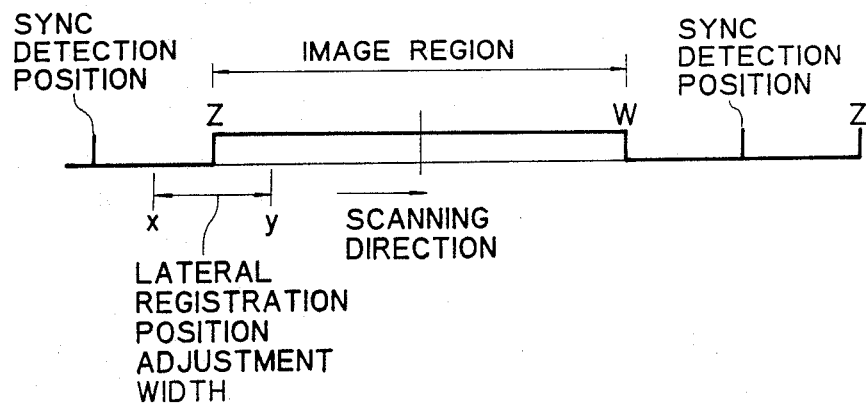
FIG. 4 is an illustration which is useful for explaining the relationship among a sync detection position, an image region and a lateral registration position.

In a common laser beam printer, as shown in FIG. 3, the laser beam is deflected over a predetermined angle by the polygon mirror 19 and the laser beam thus deflected is detected by the sync detection sensor 23 which is disposed at a particular position within the optical writing unit 2, which corresponds to a position located prior to a start position for starting optical writing on the photosensitive drum along one scan line. The sensor 23 supplies a detection output which is used as a sync detection signal in the main or optical scanning direction. As shown in FIG. 4, after elapsing a predetermined time period subsequent to the generation of the sync detection signal, an optical writing start signal Z which indicates the optical writing start position is produced and thereafter upon elapsing of another predetermined time period which is determined in accordance with the size of the sheet of recording paper in use, an optical writing end signal W is produced. Of importance, in accordance with the principle of the present invention, the timing of producing the optical writing start signal Z is automatically adjusted in accordance with the amount of lateral positional shift of a sheet of recording paper with reference to a reference position to thereby maintain a desired relative positional relationship between an image on the photosensitive drum and a sheet of recording paper.

Figure 1:
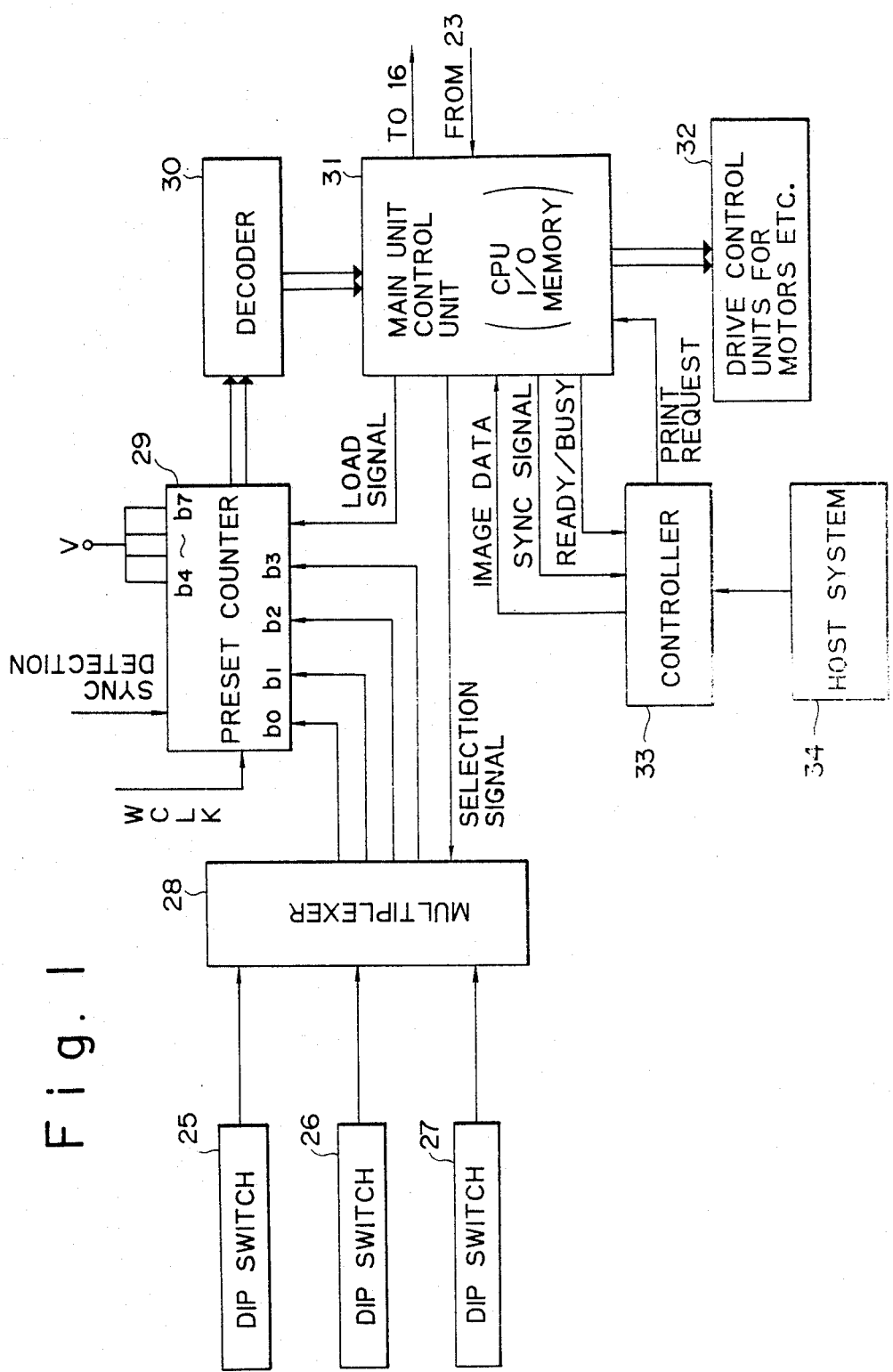
FIG. 1 is a block diagram showing the overall structure of a lateral registration adjusting device constructed in accordance with one embodiment of the present invention.

FIG. 1 is a block diagram showing the overall structure of a lateral registration adjusting device constructed in accordance with one embodiment of the present invention. As shown, the illustrated lateral registration adjusting device includes a dip switch 25, which is common to both of the first and second paper cassettes 4 and 5 and which is a switch for setting the optical writing start position, a dip switch 26 for setting the optical writing start position for the large quantity paper feed unit 7 and a dip switch 27 for setting the optical writing start position for a sheet of recording paper which has passed through the paper inversion unit 8. Each of these dip switches 25–27 may, for example, have four binary digits. Also provided is a multiplexer 28 which selects one of the dip switches 25–27 in accordance with a selection signal, which indicates which of the paper feed units 4, 5, 7 and 8 has been selected for paper feed, from a main unit control unit 31, including various components such as a CPU, I/O and memories, to be connected to a preset (programmable) counter 29.

The preset counter 29 is reset every time when a sync detection signal has been produced and an initial value for counting an optical writing start position is preset by the contents of the dip switches 25–27. And, the preset counter 29 counts an image clock WCLK (WRITE CLOCK) which is used as a reference for carrying out optical writing from that point in time and supplies its output to a decoder 30. The decoder 30 decodes a particular value in the output from the preset counter 29 whereby an optical writing start position signal Z and an optical writing end position signal W are output to the main unit control unit 31, which is comprised of various components, such as a CPU, an I/O and memories. The main unit control unit 31 is a control unit which is in charge of the overall control of the printer and which receives image data in synchronism with the image clock WCLK in response to a print request from the controller 33. A control unit 32 for motors or the like is a control unit which drives various components of the printer in accordance with a command from the main unit control unit 31. Also provided is a controller 33 which is located between a host system 34 and the present printer and which supplies the information of ASCII codes or the like from the host system 34 to the printer as converted in image data of character patterns.

Next, the operation of the first embodiment of the present invention will be described below. Because of the inclination and mechanical propensity of each of the paper cassettes 4 and 5, the large quantity paper feed unit 7 and the paper inversion unit 8, when a sheet of recording paper has arrived at the registration roller 14, the lateral position of the sheet of recording paper is not unique. Under the circumstances, the amount of lateral shift in position of each of the units is checked in advance and in order to record an image with the correction of such a lateral shift, a correction value (adjustment value) equivalent to the amount to be corrected is set in the dip switches 25–27. Upon receipt of a print request from the controller 33, unless it is in a BUSY status, the main unit control unit 31 supplies a control signal to the driver control unit 32 to thereby drive the optical writing unit 3. When a sync detection signal has been output from the sync detection sensor 23, the image clock is produced.

The main unit control unit 31 detects the fact that the unit designated by the user is whether the paper cassettes, the large quantity paper feed unit or the paper inversion unit and then supplies a selection signal to the multiplexer 28 to select the value of a dip switch which corresponds to what has been designated. In accordance with the selection signal, the multiplexer 28 sets the output from the selected dip switch among the dip switches 25, 26 and 27 to the lower bits of the programmable counter 29. An initial value is set in the counter as described above, and thereafter upon receipt of a sync detection signal, the counter 29 starts to count the image clock WCLK. When the count has reached 00H, a carry is output and it is supplied to the main unit control unit 31 through the decoder, which is set as the optical writing start point (Z of FIG. 4).

For example, if the counter 29 is an 8-bit counter, the value of the selected dip switch is set at data terminals b0–b3 and data terminals b4–b7 of upper bits are connected to $V_{cc}$. The value of the dip switch is set, for example, at 8H for the normal lateral registration, and then, as shown in FIG. 5a, the position corresponding to the timing of output of a carry from the counter 29 is located at a predetermined distance (indicated by the two-dotted line) from the left end of a sheet of recording paper which is shown by the solid line. If a sheet of recording paper has shifted laterally in the y direction in FIG. 4, the value of the dip switch is set smaller than the normal value of 8H so as to compensate for this lateral shift. In this case, since the counter 29 outputs a carry after counting an extra over the normal case, the optical writing start position is adjusted properly relative to the sheet of recording paper (indicated by the solid line) as shown by the dotted line in FIG. 5b. On the other hand, if a sheet of recording paper has shifted in position in the x direction in FIG. 4, the value of the dip switch is set larger than the normal value of 8H so as to compensate for this lateral shift. In this case, the counter 29 outputs a carry after counting less than the normal case, so that, as shown by the dotted line in FIG. 5c, the optical writing start position is adjusted properly relative to the sheet of recording paper (indicated by the solid line).

After outputting a carry for indicating to start optical writing, the counter 29 continues its counting and the fact that the counter has reached a predetermined count is detected by the decoder 30, whereby a signal indicating the optical writing end position W is output to the main unit control unit 31. The optical writing end position differs depending on the size (width) of a sheet of recording paper, so that the count to be decoded by the decoder 30 is varied in accordance with detection of the size of a sheet of recording paper by size detecting means provided in the paper cassette, thereby detecting the optical writing end position accurately.

A dip switch is provided for each paper supplying unit and thus any lateral shift of a sheet of recording paper due to the characteristic of the associated paper supplying unit may be adjusted properly simply by setting such a lateral shift in the dip switch. And thus irrespective of which of the paper supplying units is used, an image may always be formed on a sheet of recording paper with proper lateral registration. In particular, the paper inversion unit 8 has a long paper transportation path and a sheet of recording paper is turned upside down during transportation through the paper inversion unit 8, so that a relatively large lateral shift tends to occur when use is made of the paper inversion unit 8. In addition, when the paper inversion unit 8 is used, since recording is effected on both sides of a sheet of recording paper, the presence of such a lateral shift may be noticed more easily. Thus, a more precise adjustment is required in this case. If such an adjustment were to be carried out mechanically, the structure would be very complicated and the adjusting operation would be much complicated. In accordance with the present embodiment, the structure for correcting a lateral shift is simple, easy and low at cost.

In the above-described embodiment, the left end of a sheet of recording paper is set at a reference position irrespective of the size of a recording paper; however, it is to be noted that the present invention should not be limited only to such a case and for example the center of a sheet of recording paper may be used for correcting the lateral shift of a sheet of recording paper irrespective of its size. In the latter case, the reference value to be set in the preset counter 29 is varied in accordance with the size of a sheet of recording paper detected and the reference value is modified by the value set in the corresponding dip switch. Alternatively, it may also be so structured to set an added value of a reference value indicating the optical writing start position and the above-described corrected value in the dip switches 25, 16 and 27.

Figure 6A:
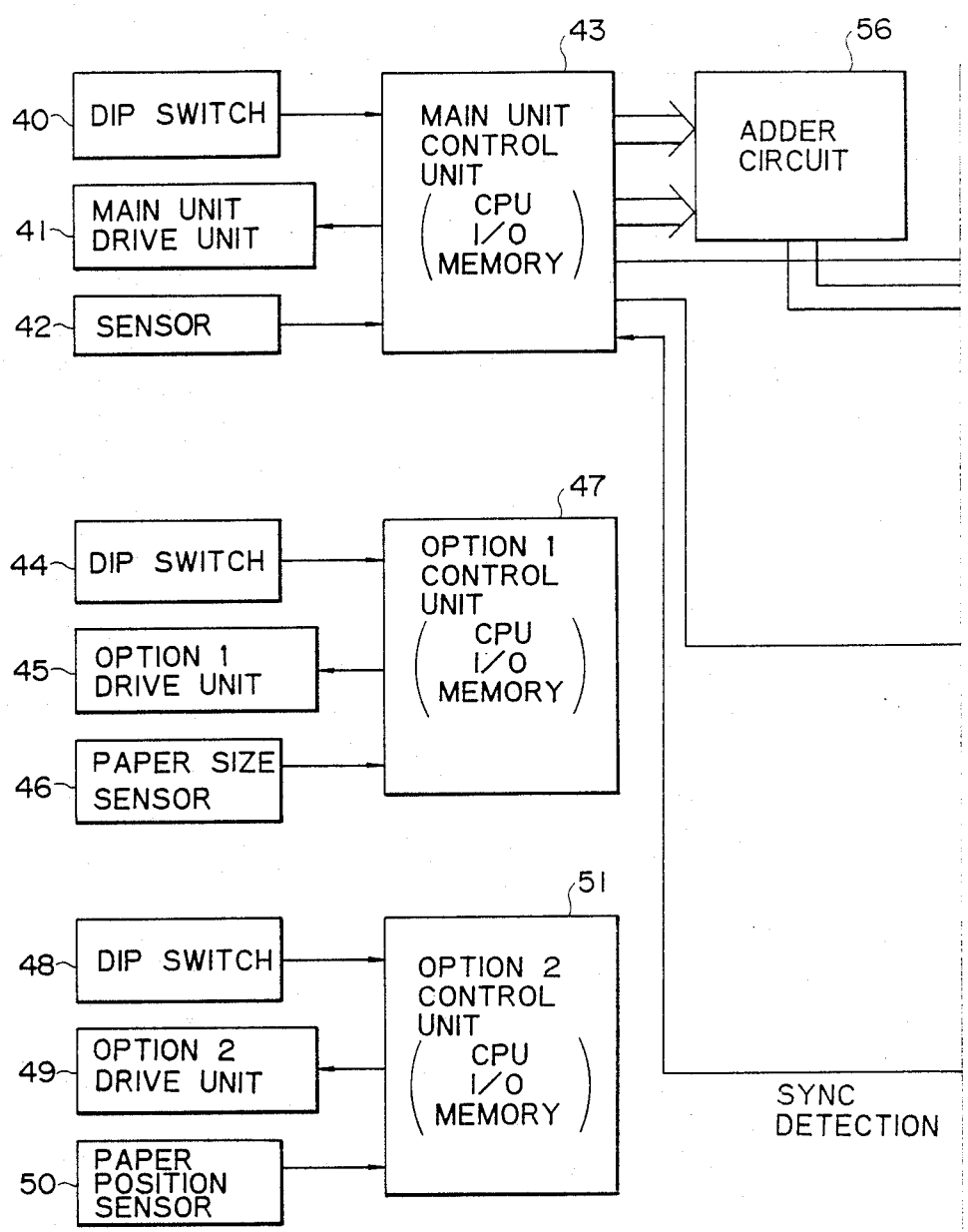
FIGS. 6a and 6b, when combined as shown in FIG. 6, define a block diagram showing the overall structure of a lateral registration adjusting device constructed in accordance with another embodiment of the present invention.
Figures 6, 6B:
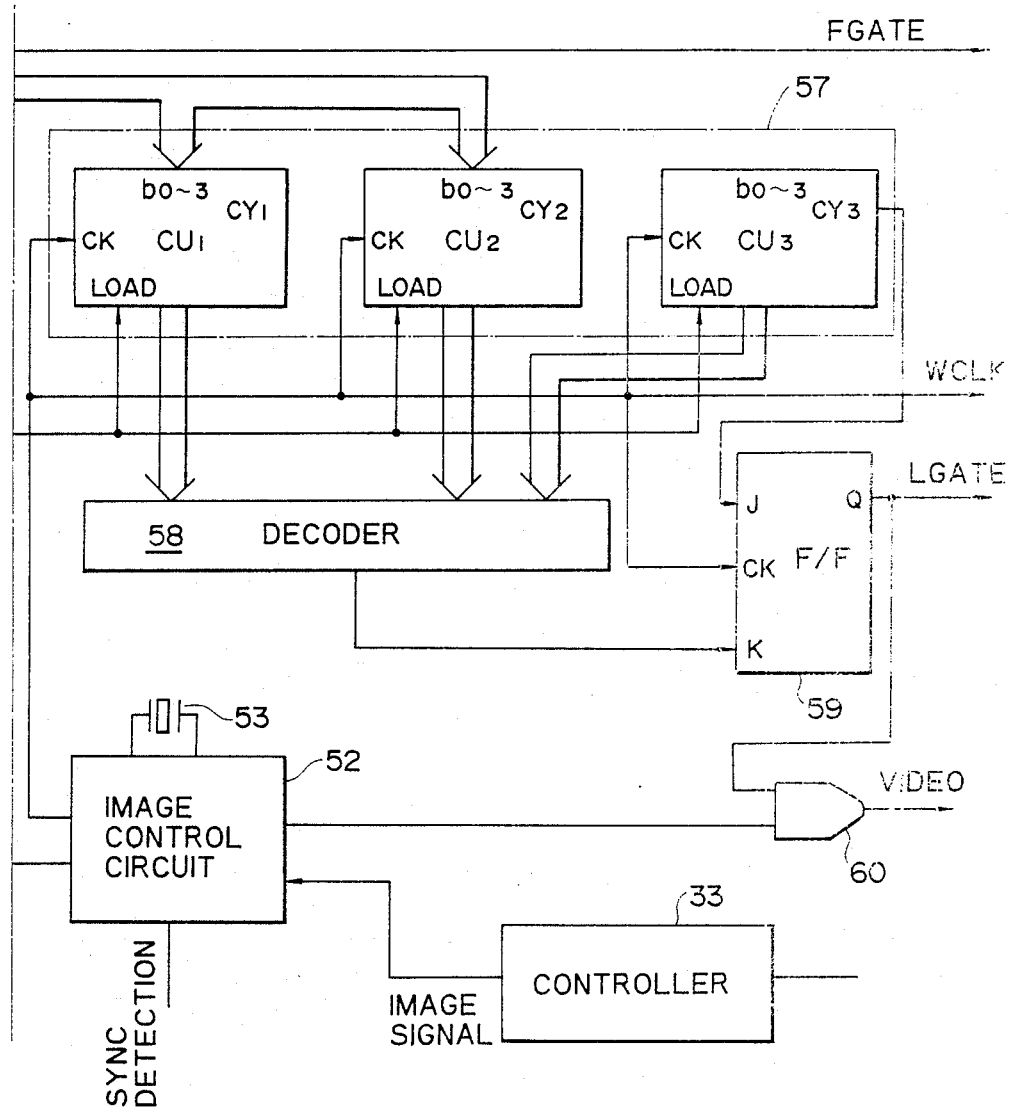
FIG. 6 is an illustration showing how to combine FIGS. 6a and 6b.

FIGS. 6A and 6B show a second embodiment of the present invention which is fundamentally similar in structure to the first embodiment shown in FIG. 1. In the first embodiment, outputs of the dip switches are selected by the multiplexer 28 and the selected output is supplied to the programmable counter 29; on the other hand, in the present second embodiment, a control unit is provided in each of the large quantity paper feed unit and the paper inversion unit, which are basically optional units, and a 4-bit dip switch for setting a lateral registration adjustment value is connected for the control unit of each such optional unit, whereby required information is transmitted between the control unit of each optional unit and the main unit control unit in a serial communication mode.

As shown in FIGS. 6A and 6B, the illustrated lateral registration adjusting device includes a main unit control unit 43 which is connected to a dip switch 40 for setting a lateral registration correction value (adjusting value) common to both of the first and second paper cassettes. Also provided is an option 1 control unit 47 for controlling the large quantity paper feed unit, which is connected to a dip switch 44. In addition, an option 2 control unit 51 for controlling the paper inversion unit is connected to a dip switch 48. The information of these dip switches 44 and 48 is supplied through a serial communication between the option control units 47 and 51 and the main unit control unit 43. The main unit control unit 43 receives various information, including sensor signals from various sensors 42, such as paper size, paper feed position and heater temperature of the image fixing unit, a sync detection signal from an image control circuit 52 and a print request signal from a controller 33 and supplies a drive control signal to a drive unit 41, thereby controlling the heater temperature, paper feed, registration clutch, main motor, developer motor, etc.

The option 1 control unit 47 is connected not only to the dip switch 44 but also to an option 1 drive unit 45 for driving the related motor, clutch, solenoid, etc. and also to a sensor 46 for sensing the paper size or the like. Similarly, the option 2 control unit 51 is also connected to an option 2 drive unit 49 and to a sensor 50 for sensing a paper feed position. An image control circuit 52 receives a sync detection signal from the sync detection sensor 23 and transfers it to the main unit control unit 43 and at the same time generates an image clock by causing a clock produced by a quartz oscillator 53 to be synchronized with the sync detection signal. In addition, the image control circuit 52 receives image data from the controller 33 and supplies it to a gate 60 in synchronism with the image clock. Also provided is an adder circuit 56 which adds the reference value indicating the reference position of image recording from the main unit control unit 43 to the correction value set by the associated dip switch and supplies its output to a preset counter 57.

The preset counter 57 is comprised of three hexadecimal count units CU1–CU3 and the output from the adder circuit 56 is set in response to a load signal from the main unit control unit 43. The preset counter 57 initiates its counting with the set value as an initial value and when it has reached its full count, a carry signal is output from the count unit CU3 and a flip-flop is set with its output Q turned on. A decoder 58 decodes a predetermined particular value of the count of the preset counter 57 and supplies its output to a reset terminal K of the flip-flop 59 with its output Q turned off. And, thus, it has a role of detecting the end position W of an image region shown in FIG. 4.

Figure 8A:
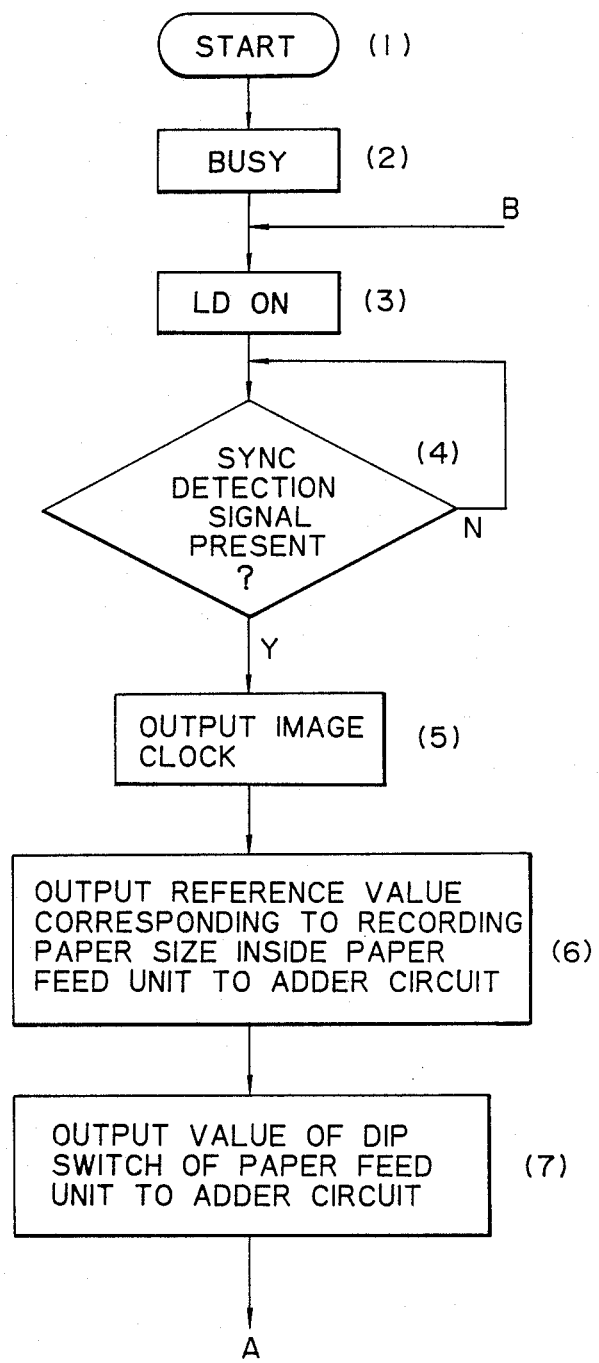
FIGS. 8a through 8c define a flow chart which is useful for understanding the operation of the lateral registration adjusting device shown in FIGS. 6a and 6b.
Figure 8B:
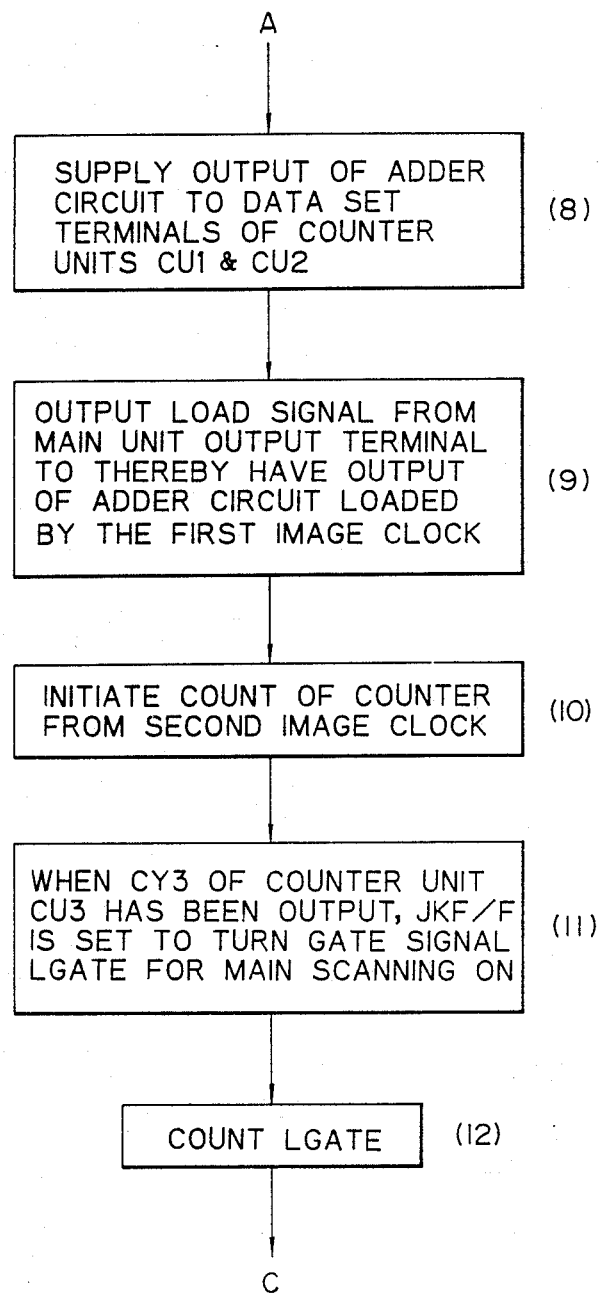
Figure 8C:
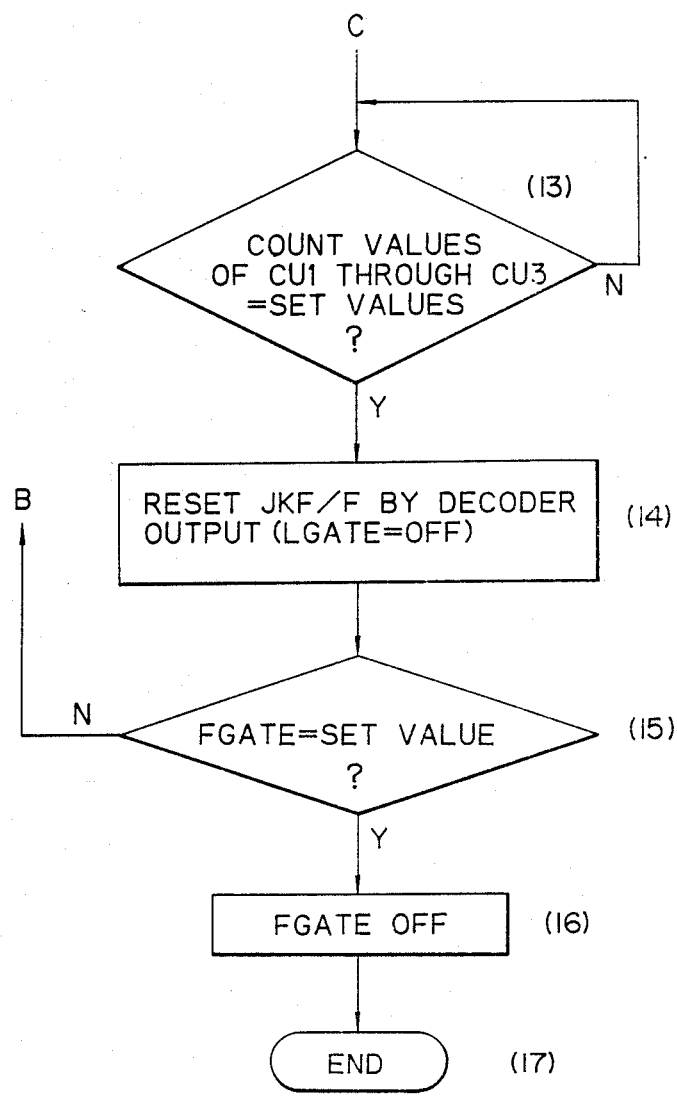

Next, the operation of the second embodiment shown in FIGS. 6A and 6B will be described with reference to a flow chart shown in FIGS. 8a–8c. The operation starts (1) in response to a print request from the controller 33 and the printer is set in a busy status while turning on the laser diode of the optical writing unit 2 (2, 3). A sync detection signal from the sync detection sensor 23 is monitored (4), and when a sync detection signal has been detected, the image control circuit 52 causes the clock generated by the quartz oscillator 53 to be synchronized with the sync detection signal to thereby output the image clock WCLK (5).

The main unit control unit 31 detects the fact that which of the paper cassettes 4 and 5, large volume paper feed unit 7 and paper inversion unit 8 has been designated by the user for use. And, the main unit control unit 31 receives a paper size detection signal of a sheet of recording paper from the sensor 42, 46 or 50 of the respective paper cassettes 4 and 5 and units 7 and 8 and calculates a reference value for the optical writing start position corresponding to the size of the sheet of recording paper, which reference value is then output to the adder circuit 56 (6). The reason why the reference value differs from paper size to paper size is because this is the case in which the center line of a sheet of paper is used as a reference. That is, if the center line of a sheet of paper is used as a reference, the writing start position for an A4 size sheet of recording paper must be set to the left of that of a B5 size sheet of recording paper (supposing that the main or optical scanning takes place from the left to the right). The correspondences between the paper sizes and the reference values are preferably stored in a memory inside of the main unit control unit 43 in the form of a table.

The main unit control unit 43 receives the value of one of the dip switches 40, 44 and 48, which corresponds to the designated one of the paper cassettes 4 and 5 and units 7 and 8 and outputs it to the adder circuit 56 (7). The adder circuit 56 adds the reference value to the value of the selected dip switch and outputs the added value to the preset counter 57. As shown in FIG. 7, the adder circuit 56 is constructed by an 8-bit full adder. Since inputs are connected to add four bits from the dip switch for the upper four bits of b4–b7 of the reference value, the unit of control for the writing start position by the unit bit of the dip switch is 8 dots. If the normal image writing start position is set such that the sum of the reference value from the main unit control unit 43 and the set value of the selected dip switch is hexadecimal 8, the image writing start position may be adjusted within ±64 dots with 8 dots at a time. An output of the adder circuit 56 is supplied to data set terminals of lower units CU1 and CU2 of the preset counter 57 (8), which is loaded by the first image clock after a load signal has been supplied from the main unit control unit 43 (9). With the output from the adder circuit 56 set, the preset counter 57 initiates its counting operation from the second image clock (10).

When a carry signal is output from a carry terminal CY3 of the MSB counter unit CU3, it is supplied to a set input terminal J of the JK flip-flop 59 which is thus set, and thus an on output is produced at the output terminal Q of the flip-flop 59 (position Z in FIG. 4), which is output as a main scanning gate signal LGATE (11). The AND gate 60 is set open by the on output of the main scanning gate signal LGATE, thereby supplying image data supplied from the controller 33 through the image control circuit 52 to the optical writing unit 2. The main scanning gate signal LGATE is also supplied to the main unit control unit 43 which counts this signal to generate an auxiliary scanning gate signal FGATE (12).

On the other hand, the preset counter 57 continues its counting even after a carry signal has been output from the counter unit CU3. The count value is supplied to the decoder 58 which decodes a predetermined particular value and supplies its output (13) which is input to the reset input terminal K of the JK flip-flop 59 to have it reset (14). And then the main scanning gate signal LGATE output from the output terminal Q is turned off (position W in FIG. 4). While the main scanning gate signal LGATE is on, one scan line image is recorded. And, in order to check whether there is another scan line to be recorded, the main unit control unit 43 determines whether the count value of the before-mentioned main scanning gate signal LGATE has reached a predetermined value (15). If the predetermined value has not yet been reached, since the auxiliary scanning has not yet been completed, it goes back to step (3) in order to be ready for the next main scanning. If the predetermined value has been reached, the auxiliary scanning gate signal FGATE is turned off (16) to thereby complete the print operation (17).

As described above, in accordance with the present invention, even if a sheet of recording paper has shifted in the lateral direction with respect to a predetermined reference position, the sheet of recording paper is left as it is and the optical writing start position is suitably adjusted in view of the amount of the lateral shift of the sheet of recording paper. And, thus, a relative positional relationship between a sheet of recording paper and an image to be transferred thereto is maintained at constant at all times. Thus, since it is not necessary to move a sheet of recording paper sideways or in the lateral direction, the correction or adjustment of lateral registration can be carried out without requiring a mechanical structure. It should also be noted that the present lateral registration adjusting device is effective in correcting the lateral shift due to scatter in paper width.

In general, in an image forming apparatus, such as a laser beam printer, an image processing apparatus processes the data received from the host system to produce an image data which is used for forming an image. When paper jamming has occurred in such an image forming apparatus, the image recorded on the paper which has jammed must be recorded again on another sheet of paper. For this reason, in a typical image processing apparatus, it is so structured to retain the image data even after the image data has been transferred to the image forming apparatus and the retention of the image data is released upon receipt of a paper discharge completion signal from the image forming apparatus as a paper jam back-up scheme. However, the image forming apparatus may be provided with a plurality of paper discharging positions and there may be several different sizes of paper to be supplied from a plurality of paper supplying units. As a result, depending on combination, the paper supply order may differ from the paper discharge order. In this case, if the retention of image data is released upon receipt of a paper discharge completion signal as described above, there arises a situation in which the image data is lost even if the paper to which the image data has recorded has jammed. A paper jam back-up process in this case will be complicated.

Figure 9A:
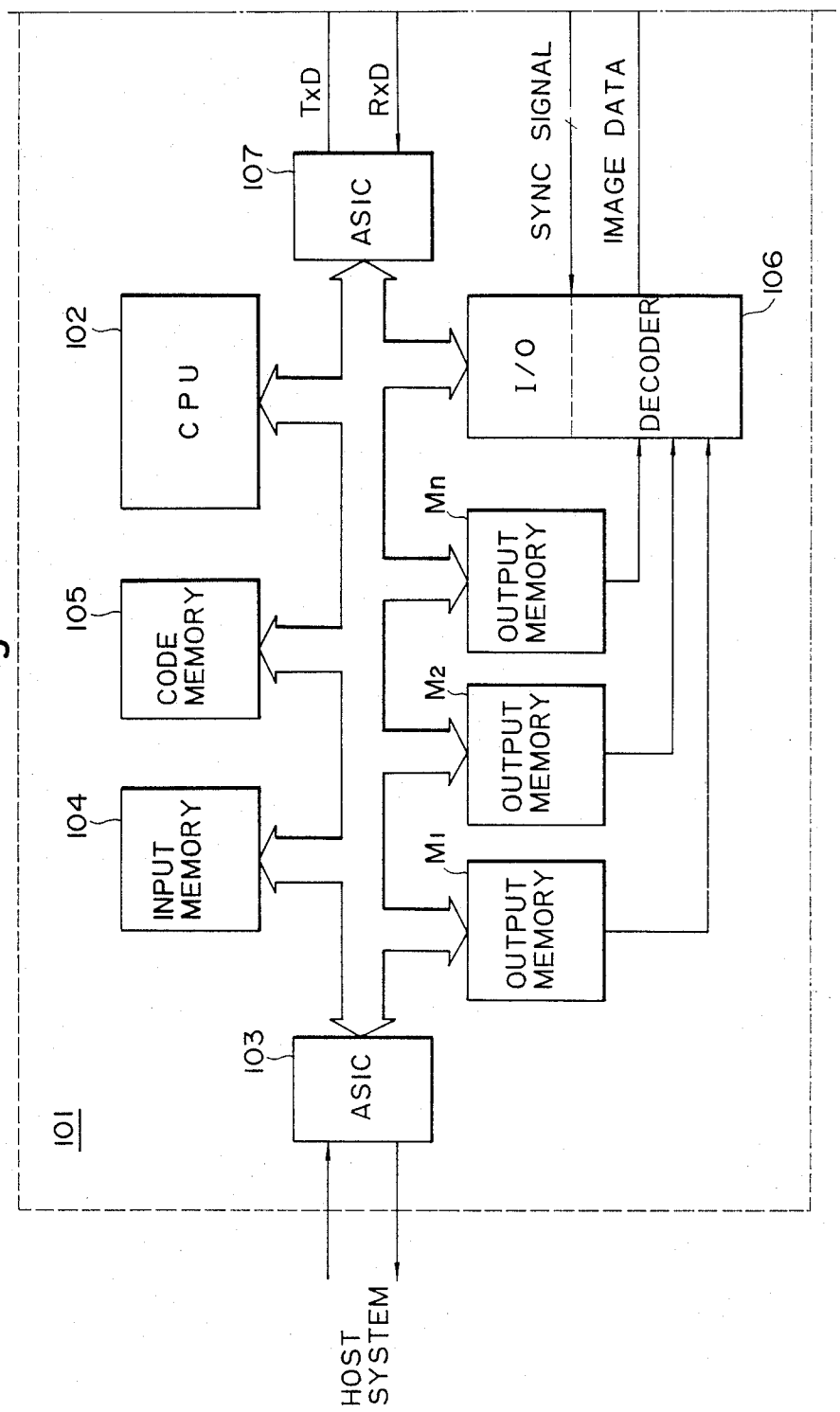

In accordance with another aspect of the present invention, there is provided an image forming apparatus including means for adding management number information to an image formation start signal. Referring now to FIGS. 9A and 9B, there is shown in block form an image process controller 101 as an image processing apparatus, which includes a microcomputer 102 in charge of the overall control of the image process controller 101 and comprised of a CPU, ROM, RAM and I/O, a serial interface (ASIC) 103 in charge of transmission of data with the host system, an input buffer 104 for temporarily storing receive information, such as print code, character code and command, from the host system, a code memory 105 for storing the data which has been obtained by processing the received information, n number of output memories $M_l$–$M_n$ for storing the image data obtained by processing the print code or the like, an I/O decoder 106 for transferring the image data read out of the output memories M$_I$-M$_n$ to an engine sequence controller (also referred to as "engine driver") 111 and for transmitting or receiving a sync signal to or from the engine driver 111, and a serial interface (ASIC) 107 for transmitting or receiving various control data to and from the engine driver 111.

The engine driver 111 as an engine sequence controller includes a microcomputer 112 in charge of the overall control of the engine driver 111 and comprised of a CPU, ROM, RAM and I/O, a serial interface (ASIC) 113 for transmitting and receiving various control data to and from the image process controller 101, a code memory 114 for storing received data from the image process controller 101, a data memory 115 for storing various process data, an image write-in control unit 116 for outputting a laser modulation signal according to the image data to a laser diode unit of an optical writing unit of a laser-described printer engine in accordance with the image data from the image process controller 101, and an I/O 117 for transmitting various drive signals to the printer engine and for transmitting or receiving detection signals to or from sensors.

Figure 10:
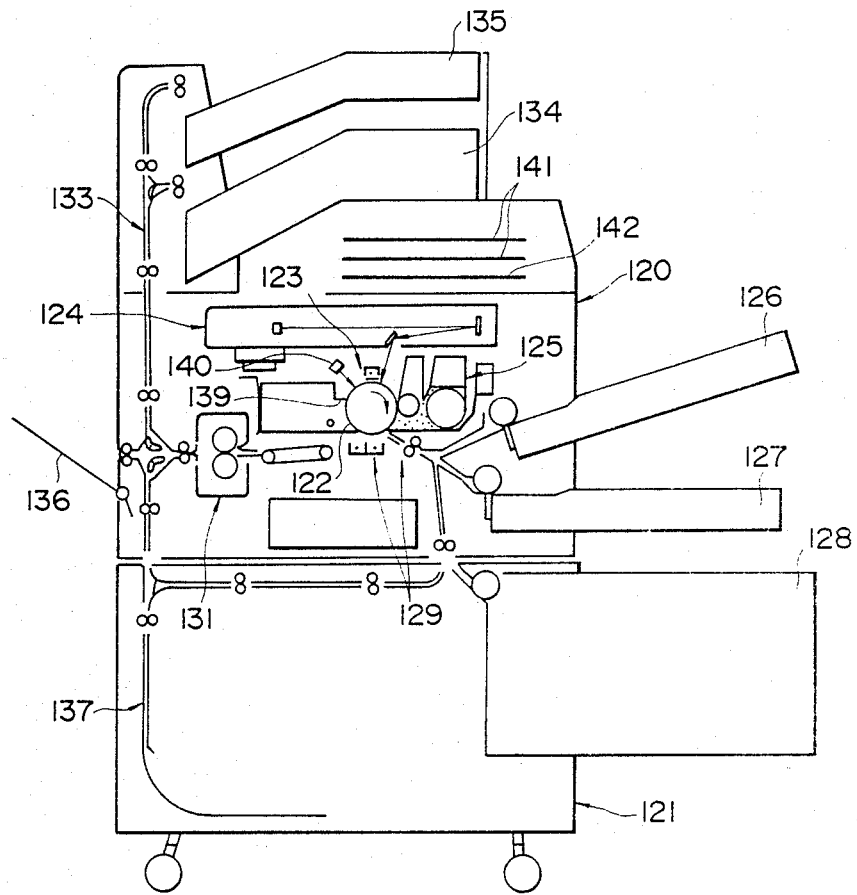
FIG. 10 is a schematic illustration showing the overall structure of a laser beam printer incorporating the structure shown in FIGS. 9A and 9B.

FIG. 10 schematically illustrates the printer engine of a laser beam printer. The illustrated laser printer includes a printer main body 120 and a table 121. And, a photosensitive drum 122 is driven to rotate in the direction indicated by the arrow by a main motor which is not shown according to print start. In this case, the peripheral surface of the photosensitive drum 122 is uniformly charged by a charger 123 and a laser beam carrying image information is directed to the photosensitive drum 122 from the optical writing unit 124 to thereby cause the laser beam to scan across the photosensitive drum 122 (main scanning). With the scanning of the laser beam across the photosensitive drum 122 and the rotation of the photosensitive drum 122 in the direction indicated by the arrow (auxiliary scanning), an electrostatic latent image commensurate with image data is formed. And, the latent image is developed by a developing unit 125 to thereby form a visible toner image.

A top-most sheet of recording paper stored in the selected one of a paper feed tray 126 (also referred to as tray 1), a paper feed tray 127 (also referred to as tray 2) and a large quantity paper feed tray 128 is fed and transported until it comes into abutment against a registration roller 129. At a predetermined timing, the registration roller 129 is driven to rotate to thereby cause the sheet of recording paper to be transported again. Thus, the sheet of recording paper is brought into contact with the photosensitive drum 122 at an image transfer station. Then, at a predetermined timing, a predetermined voltage is applied to an image transfer and separation corona unit 130 so that the toner image on the photosnsitive drum 122 is transferred onto the sheet of recording paper and then the sheet of recording paper is separated away from the photosensitive drum 122. Then, the thus separated sheet of recording paper is transported toward an image fixing unit 131 by means of a transportation belt, where the toner image is permanently fixed to the sheet of recording paper by fusion.

Thereafter, the sheet of recording paper to which the toner image has been fixed is discharged onto a first paper discharge stacker 134 (paper face down discharge 1) or onto a second paper discharge stacker 135 (paper face down discharge 2) through a discharge path 133, or discharged onto a third paper discharge stacker 136 (paper face up discharge), or supplied into a both side print unit 137. On the other hand, after completion of image transfer, the photosensitive drum 122 is cleaned by a cleaning blade 139 and any residual charge is eliminated by a charge removing lamp 140 so that the photosensitive drum 122 is set ready for the next cycle of operation. The printer main body 120 houses therein a substrate 141 on which the above-described image process controller 101 is defined and another substrate 142 on which the engine drive 111 is defined.

The operation of the above-described structure will be described below with reference to FIG. 11 et seq. In the first place, when the image process controller 101 receives a print code from the host system, which may be an image process apparatus, such as a word processor, computer, work station, or an image edit process unit, the print code is converted into an image data which is a dot pattern data and stored into the output memories M$_I$-M$_n$. For example, upon completion of storing of image data for one page, a print start request signal as an image formation start signal is transmitted to the engine driver 111. If the engine driver 111 can receive this print start request signal, it requests the image process controller 101 to transmit a print ID. Thus, the image process controller 101 transmits to the engine driver 111 a print ID, including a print data No. as management number information, paper feed select information, paper discharge select information, or the like. Then, the conversion of print codes into image data is carried out until one page of image data has been prepared. Then, a print start request signal is transmitted to the engine driver 111 if the previous print start request signal has been received by the engine driver 111.

The engine driver 111 receives print start request signals from the image process controller 101 until a print continuation impossible error (hard error or paper jam) has occurred or a print ID input buffer for storing print IDs has become full and prints image data thus received in sequence. A sheet of recording paper is fed from a paper feed unit designated by the print ID and transported until it comes into abutment against the registration roller. After the sheet of recording paper is again transported by the registration roller, an image sync signal LGATE is generated and in synchronism with the image sync signal LGATE, image data is transferred from the image process controller 101 to the engine driver 111 as a raster signal. Prior to this image sync signal LGATE, an image data transmission preparation request code and a print ID which has been previously received from the image process controller 101 are transmitted to the image process controller 101 which transmits the image data corresponding to the print data No. indicated by the print ID to the engine driver 111.

And when an image has been optically written, developed, transferred to a sheet of recording paper, fixed and then the sheet of recording paper has discharged to a designated paper discharging station, its print ID, together with a print end signal, is sent to the image process controller 101, which is followed by the step of clearing the print ID from the print ID input memory. On the other hand, the image process controller 101 clears the image data stored in the output memory Mi (i=1−n) which corresponds to the print data No. indicated by the received print ID. The image data is retained up to this point in time so as to allow to print the same image data again after removing an error, such as a paper jam error.

Figure 11A:
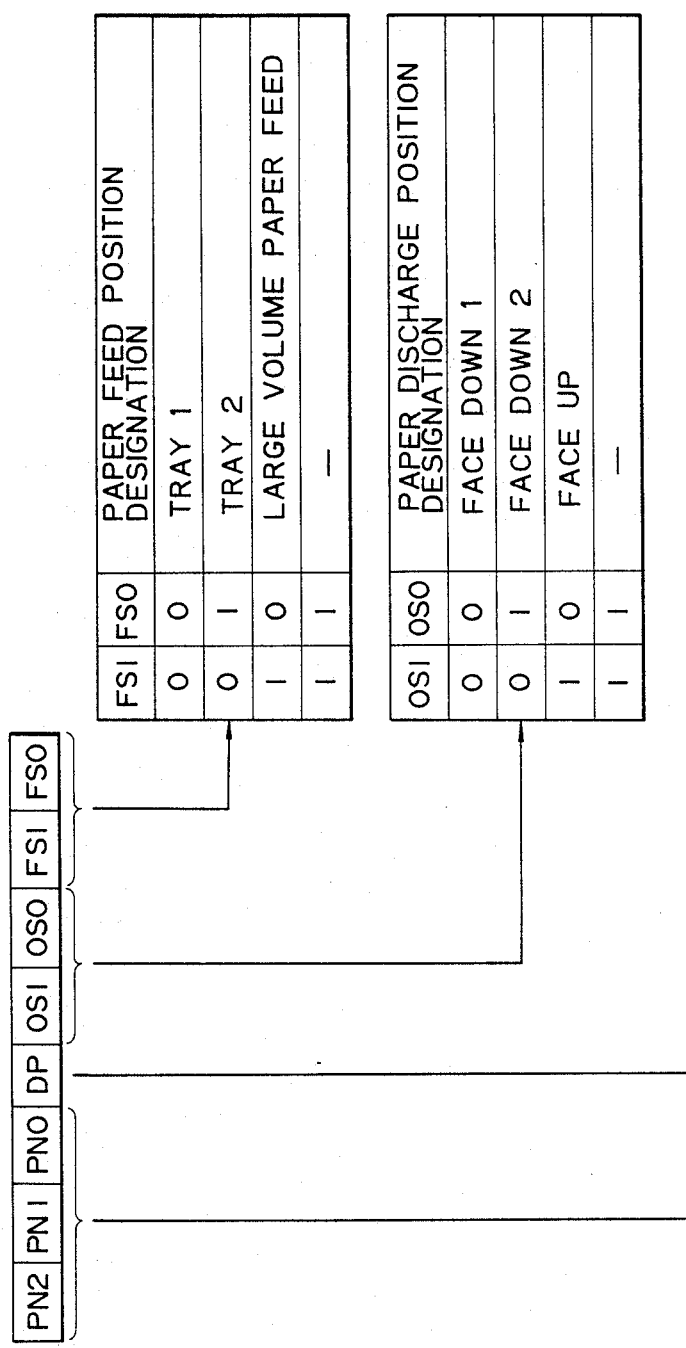
Figures 12, 12B:
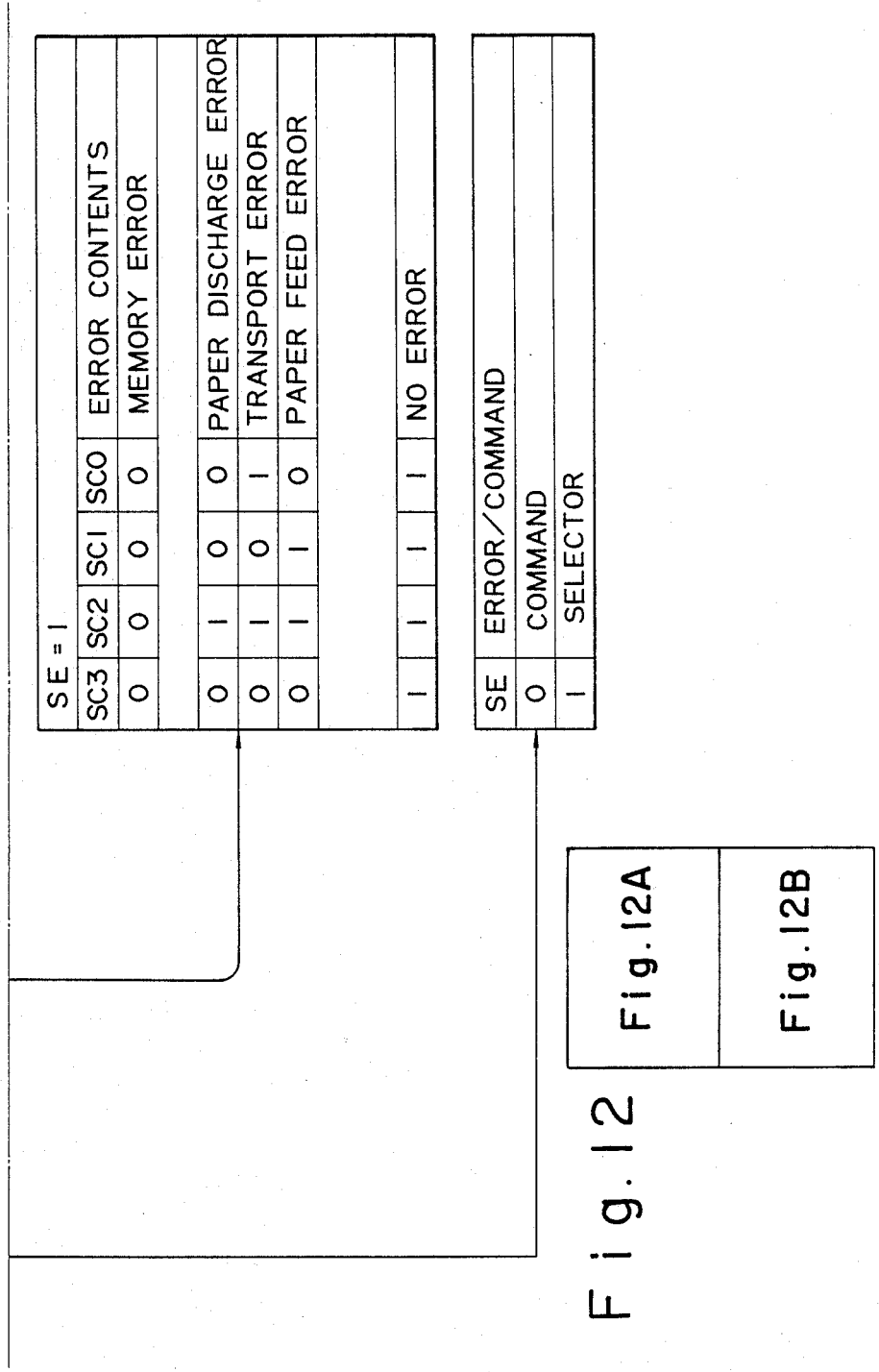

With reference to FIG. 11 et seq., the detailed process in the engine driver 111 will be described. In the first place, a print ID and a command/error status which are transmitted between the image process controller 101 and the engine driver 111 will be described with particular reference to FIGS. 11 and 12. As shown in FIG. 11, a print ID is comprised of paper feed position designation (paper feed select) information FS0, FS1, paper discharge position designation (paper discharge select) information OS0, OS1, both side designation information DP and print data No. PN0, PN1, PN2 as management number information. As shown in FIG. 12, a command/error status is comprised of command/error contents information SC0-SC6 and command/error switch information SE.

Figure 13:
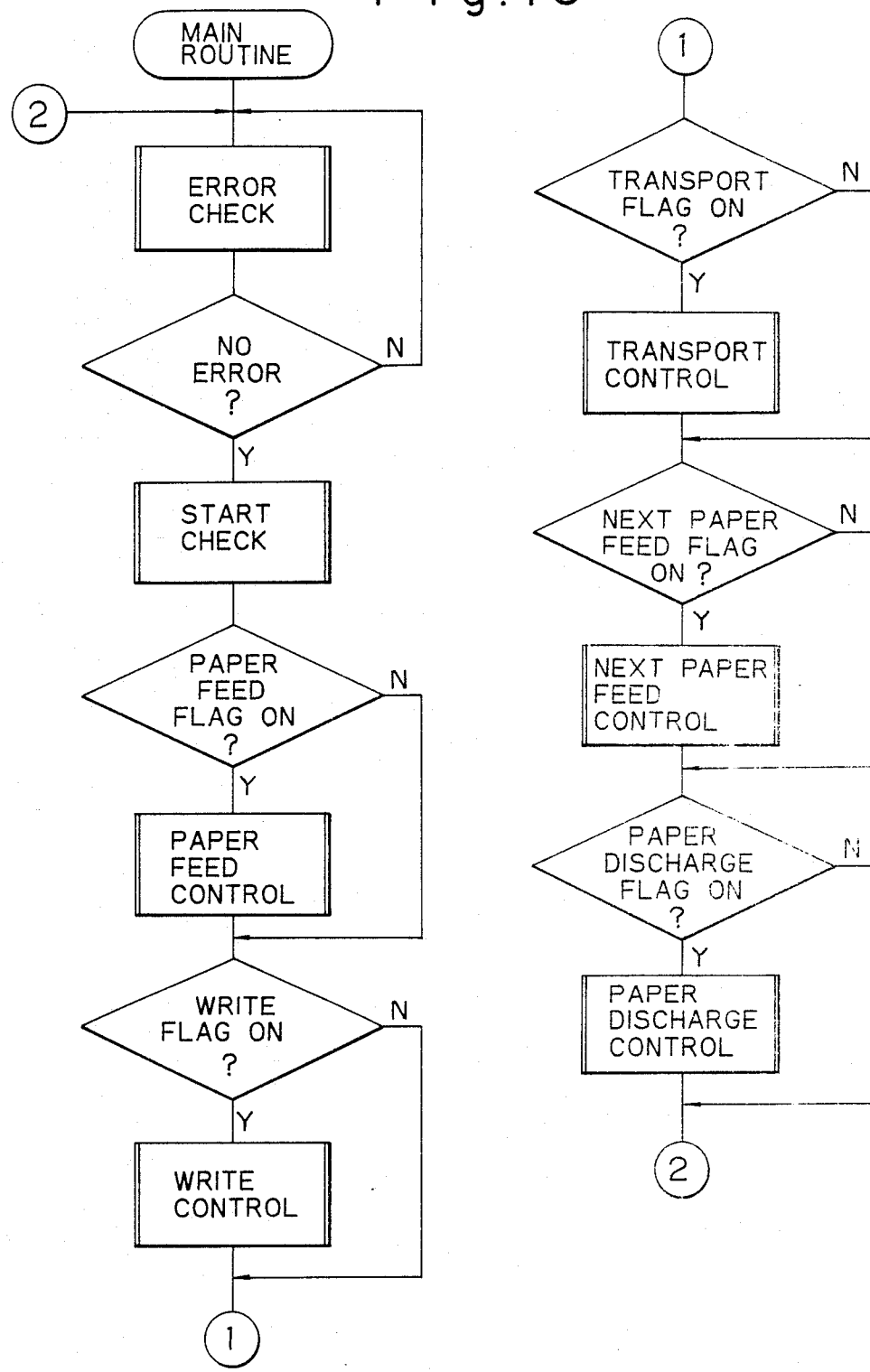
FIGS. 13 through 19 are flow charts which are particularly useful for understanding the operation of the engine driver shown in FIG. 9.

In the main routine shown in FIG. 13, the engine driver 111, in the first place, carries out an error check process to check the presence or absence of the occurrence of an error. And, if there is no error, it carries out a start check process to thereby process the reception of a print start request and a print ID from the image process controller 101. Thereafter, a paper flag is checked, and a paper feed control process is carried out if the paper feed flag is on. Then, a write flag is checked, and a write control process is carried out if the write flag is on. Then, a transport flag is checked, and a transport control process is carried out if the transport flag is on. And, then, a next paper feed flag is checked, and a next paper feed control process is carried out if the next paper feed flag is on. And, then, a paper discharge flag is checked, and a paper discharge control process is carried out if the paper discharge flag is on.

Figure 14:
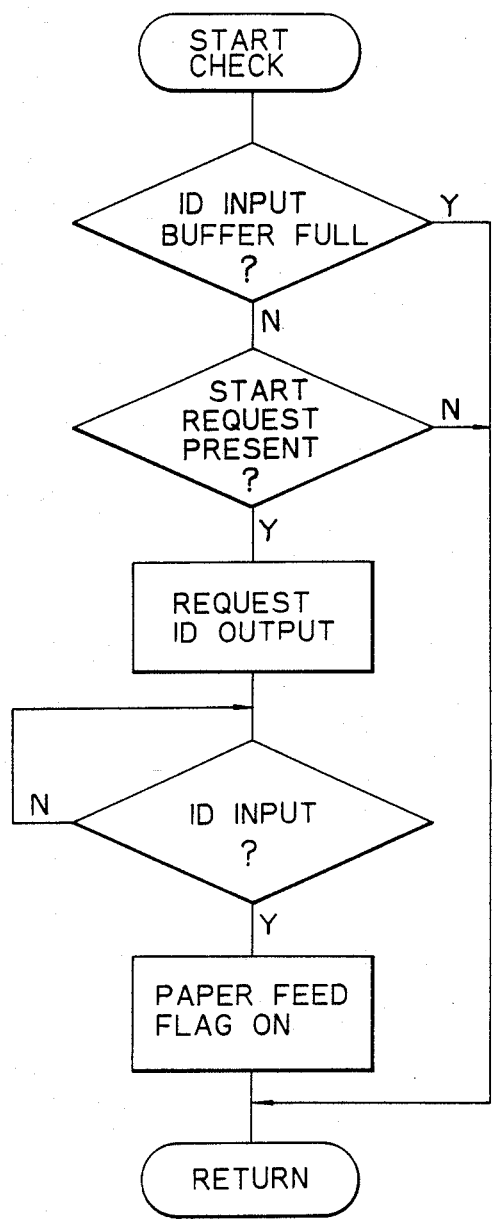

Next, a start check process will be described with reference to FIG. 14. In this start check process, it is determined whether the print ID input buffer is full or not, and if the print ID input buffer is not full, it is determined whether there is a print start request from the image process controller 101. If there is a print start request, a request is made to the image process controller 101 to output a print ID. After a print ID has been input from the image process controller 101, a paper feed flag, which is a flag for initiating the feeding of a sheet of recording paper, is rendered on.

Figure 15A:
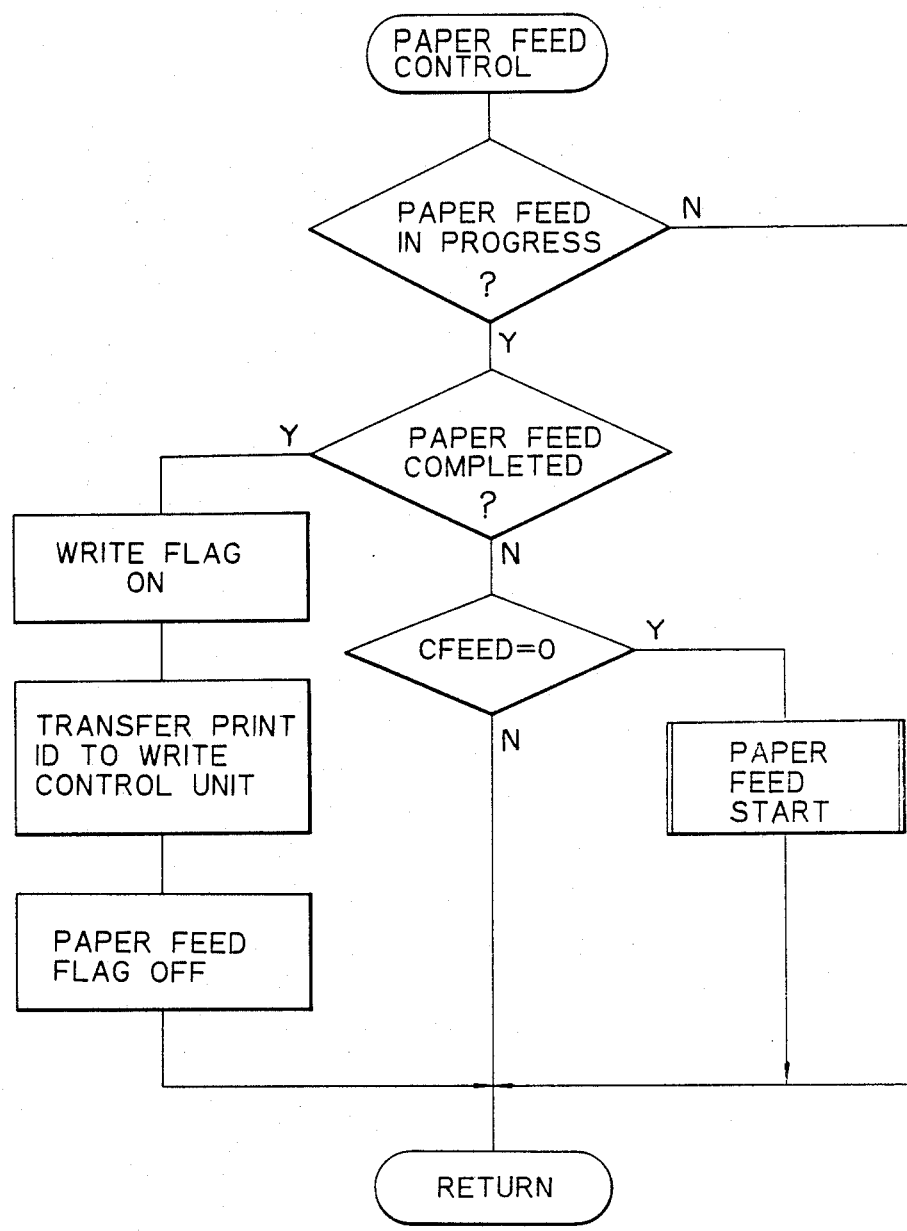
Figure 15B:
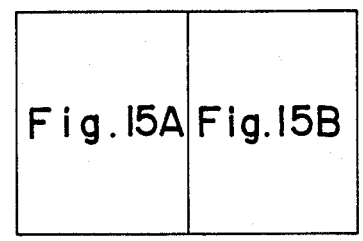
Figure 15:
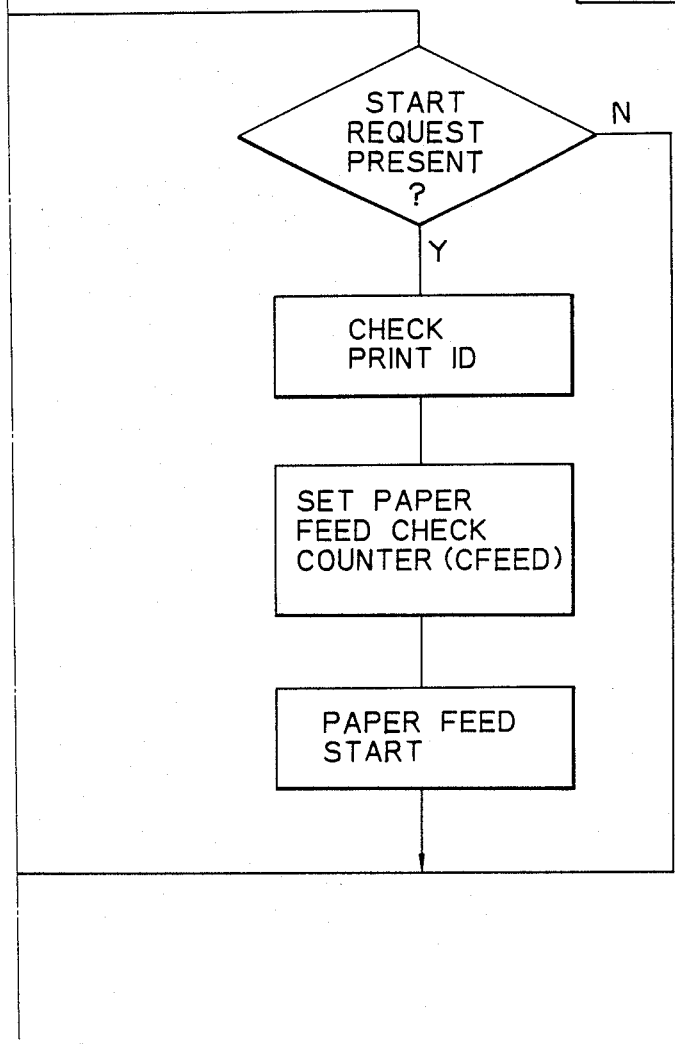

Next, a paper feed control process will be described with reference to FIG. 15. In this paper feed control process, it is first checked whether paper feeding is in progress or not. And, if paper feeding is not in progress, it is checked whether there is a print start request, and if there is a print start request, the print ID is checked and the time designated by the print ID depending on the paper feed position is set in a paper feed check counter CFEED for managing the time from paper feed start to paper feed error, followed by the step of starting paper feed. On the other hand, if there is no print start request, then it returns to the main routine. If paper feeding is not in progress, it is determined whether it is paper feed completion or not. And, if it is not paper feed completion, it is checked whether the paper feed check counter CFEED is "0" or not, and if it is not "0", it returns to the main routine. On the other hand, if it is "0", then it indicates the fact that paper feeding has not been completed within a predetermined time period so that a paper feed error process is carried out and then it returns to the main routine. If paper feeding is not in progress and it is paper feed completion, then a write flag for initiating a write control is turned on, and thereafter the print ID is transferred to the write control unit, which is followed by the steps of setting the paper feed flag off and returning to the main routine.

Figure 16A:
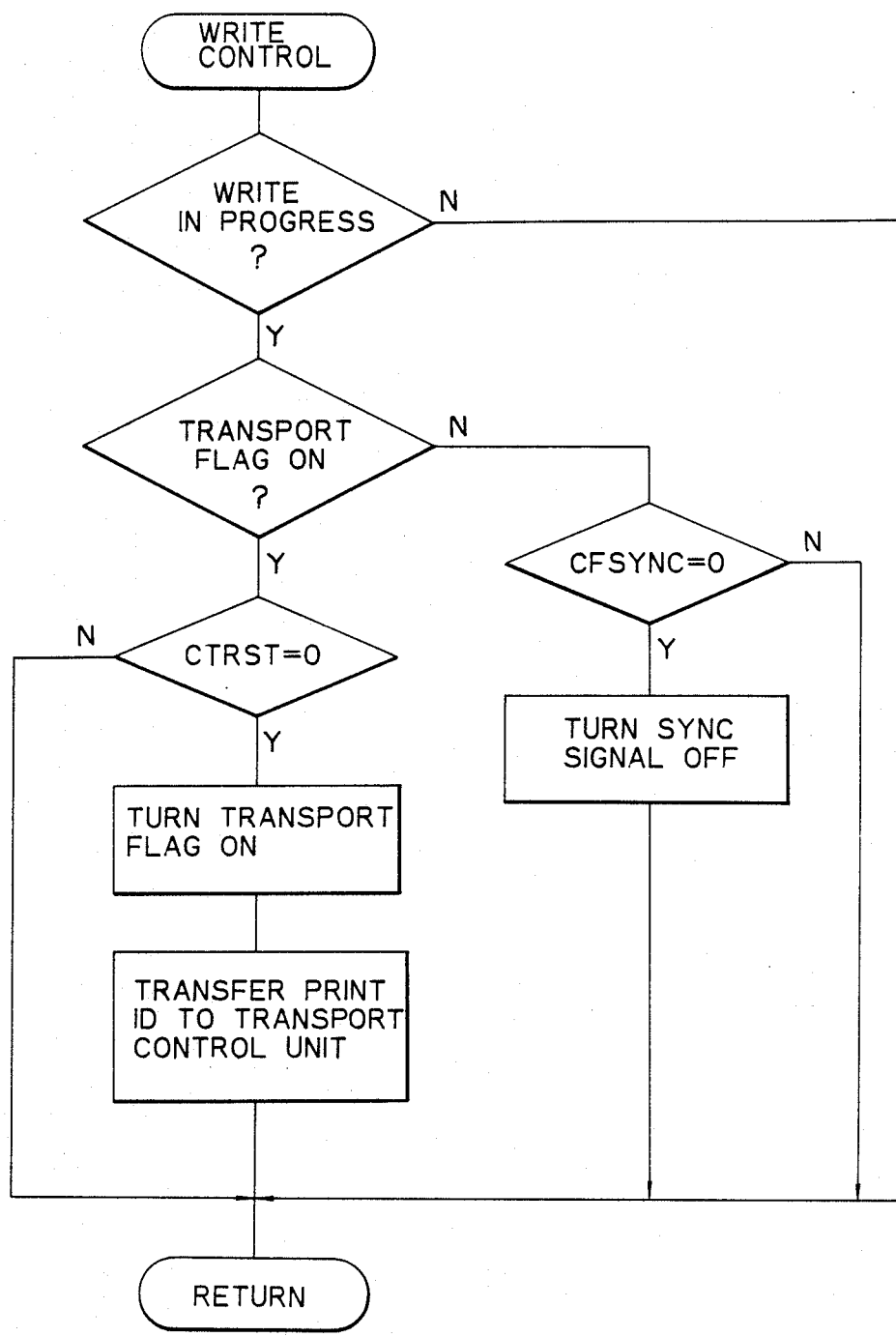
Figure 16:
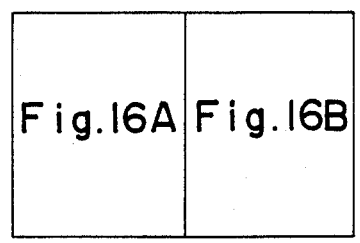
Figure 16B:
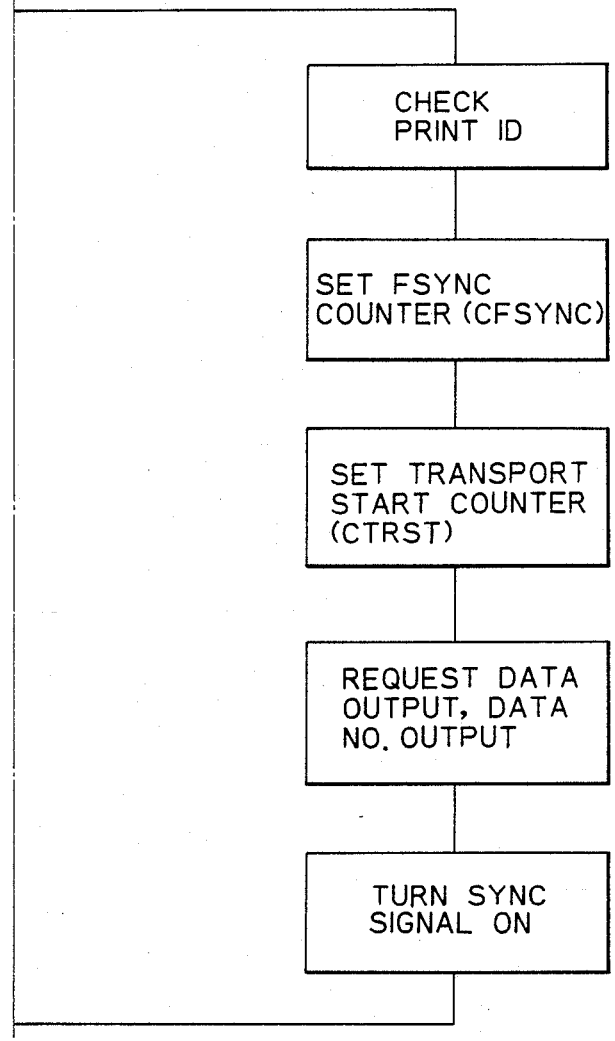

Next, a write control process will be described with reference to FIG. 16. In this write control process, it is first determined whether writing is in progress or not. And, if writing is not in progress, the print ID is checked to thereby set the number of lines in accordance with the size of a sheet of recording paper in a FSYNC counter CFSYNC, which manages the number of frame sync signals FSNC, i.e., the number of scanning lines in the main scanning direction. Then, a predetermined time period is set in a transport start counter CTRST which manages the time from the turning on of the frame sync signal FSYNC to the initiation of transportation. And, then, a command indicating a request for data output and the requested print data No. is supplied to the image process controller 101, thereby turning the frame sync signal FSYNC on, which is followed by the step of returning to the main routine.

On the other hand, if writing is not in progress, it is determined whether the transport flag is on or not, and if the transport flag is not on, it is checked whether the FSYNC counter CFYNC is "0" or not. If it is not "0", then it immediately returns to the main routine. If it is "0", then the frame sync signal FSYNC is turned off and then it returns to the main routine. Moreover, if the transport flag is on, it is checked whether the transport start counter CTRST is "0" or not, and if it is not "0", then it returns to the main routine. On the other hand, if it is "0", then the transport flag for initiating the transport control is turned on to transfer the print ID to the transport control unit and then it returns to the main routine.

Figure 17A:
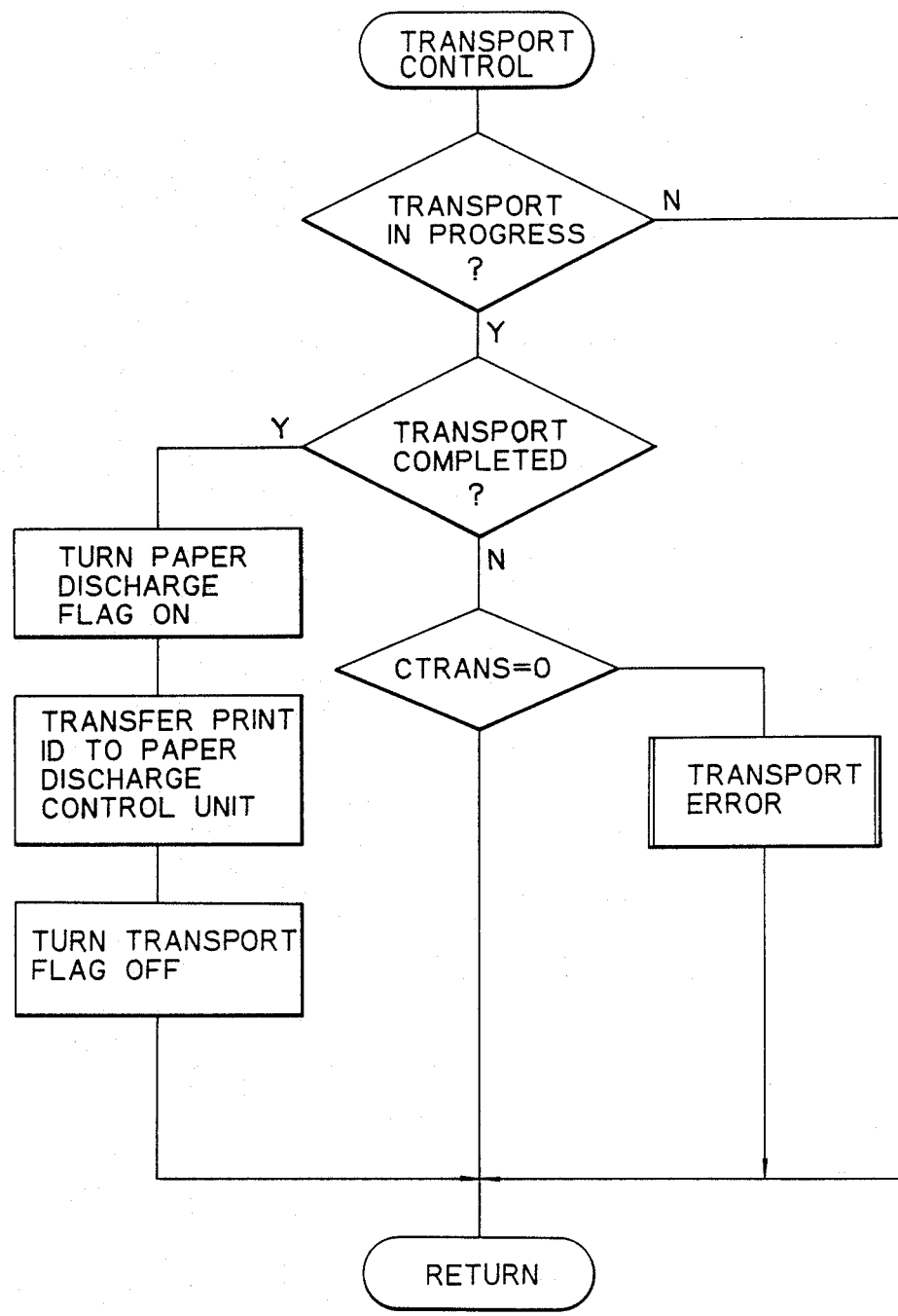
Figure 17:
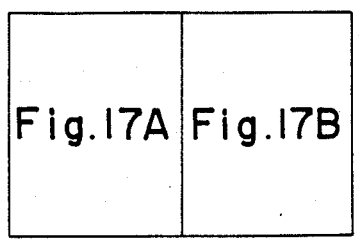
Figure 17B:
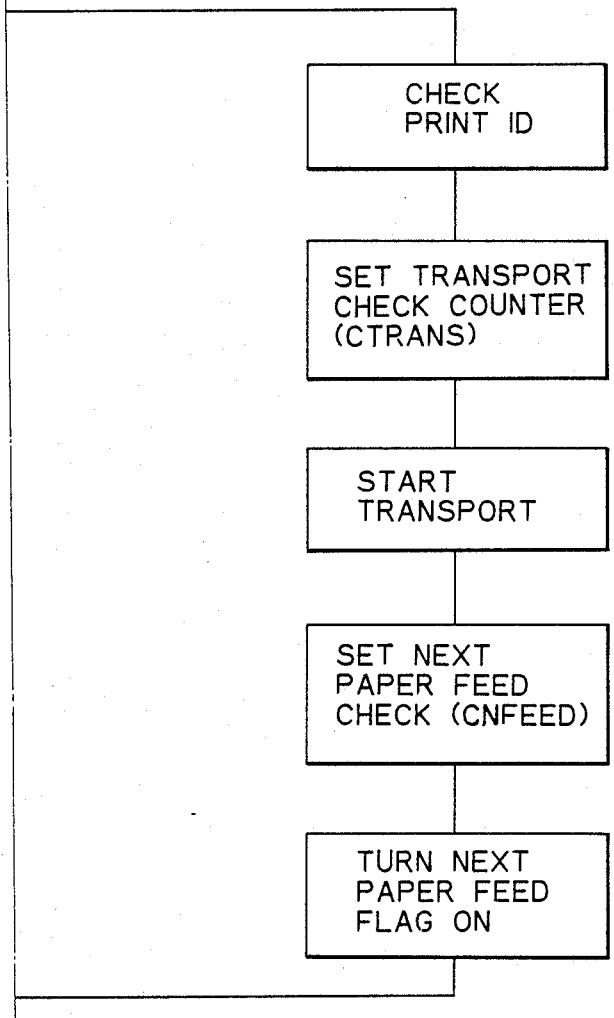

Next, a transport control process will be described with particular reference to FIG. 17. In this transport control process, it is first checked whether transportation is in progress or not. And, if transportation is not in progress, then the print ID is checked and a predetermined time period is set in a transport check counter CTRANS which manages the time from the initiation of transportation to a transportation error check. After initiation of transportation, a time period depending on the size of a sheet of recording paper and the paper feed position is set in a next paper feed check counter CNFEED which manages the time from the initiation of transportation to the point in time capable of feeding the next sheet of recording paper. And then a next paper feed flag for initiating a next paper feed control process is turned on and then it returns to the main routine.

On the other hand, if transportation is in progress, it is checked whether it is the end of transportation or not, and if it is not the end of transportation, then it is checked whether the transportation check counter CTRANS is "0" or not. If it is not "0", then it immediately returns to the main routine. On the other hand, if it is "0", since it indicates the fact that transportation has not been completed within a predetermined time period, a transportation error process is carried out and then it returns to the main routine. Furthermore, if transportation is not in progress and it is the end of transportation, then a paper discharge flag for initiating a paper discharge control process is turned on to transfer the print ID to the paper discharge control unit, and after turning the transportation flag off, it returns to the main routine.

Figure 18:
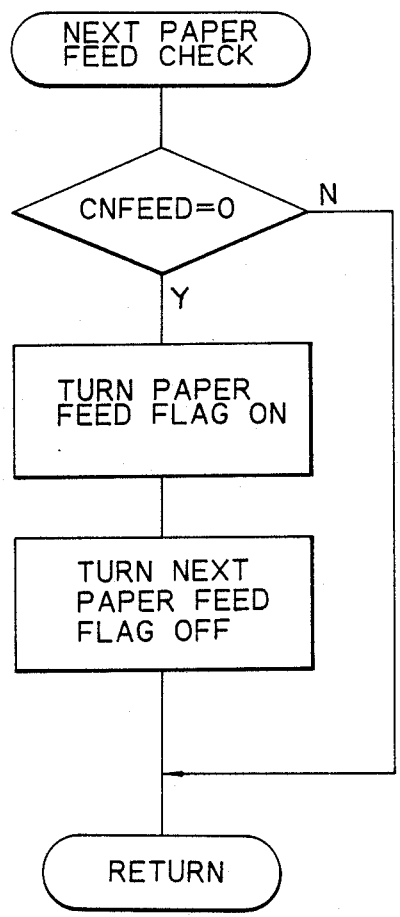

Next, a next paper feed control process will be described with particular reference to FIG. 18. In this next paper feed process, it is determined whether a next paper feed check counter CNFEED is "0" or not, and if it is "0", then it immediately returns to the main routine. On the other hand, if it is not "0", it returns to the main routine after turning the paper feed flag on and the next paper feed flat off.

Figure 19:
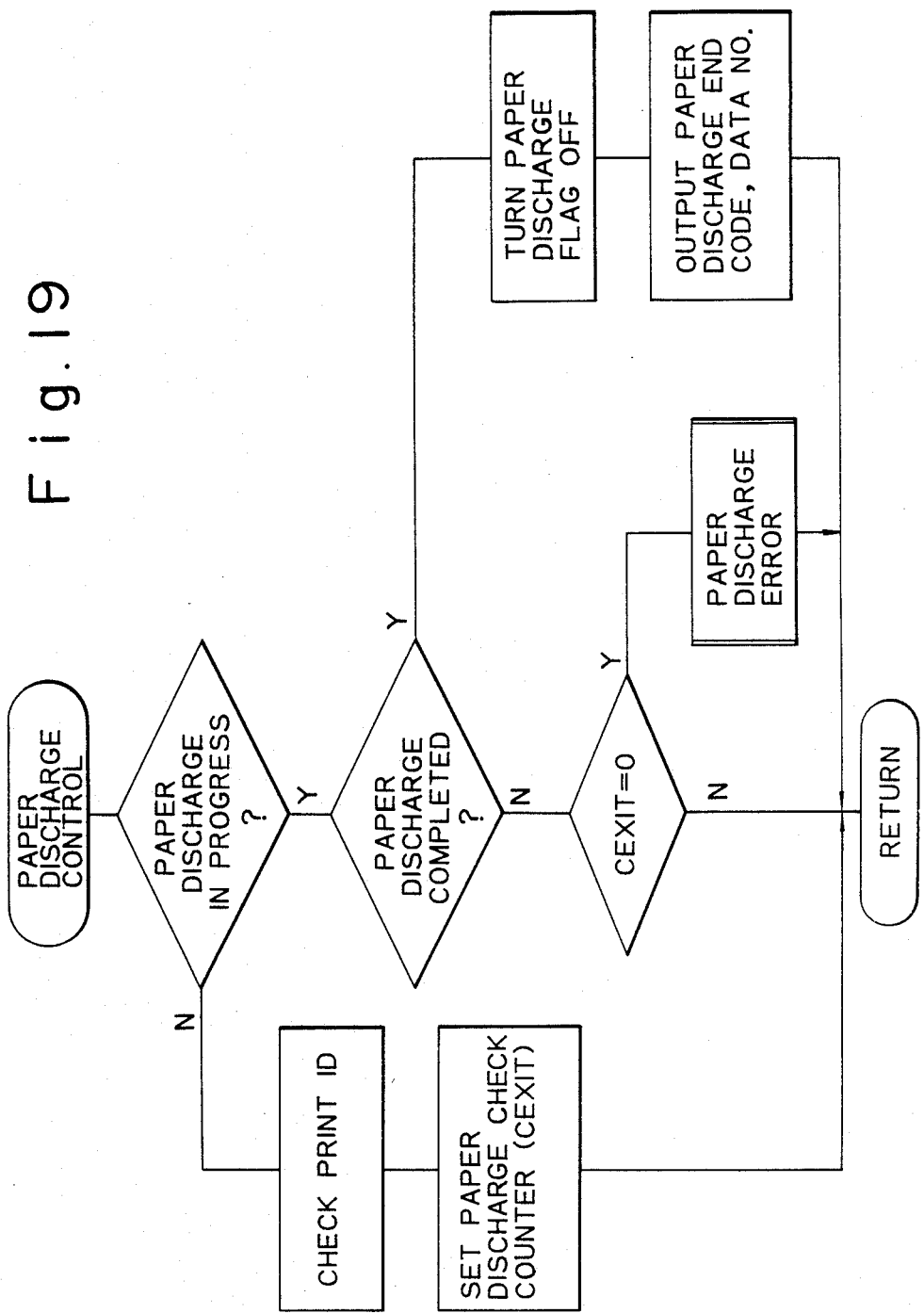

Next, a paper discharge process will be described with particular reference to FIG. 19. In this paper discharge control process, it is first checked whether paper discharge is in progress or not. And, if paper discharge is not in progress, the print ID is checked, and it returns to the main routine after setting a time period, which corresponds to the size of a sheet of recording paper and the designated paper discharge position, to a paper discharge check counter CEXIT which manages the time from the end of transportation to a paper discharge error check. On the other hand, if paper discharge is in progress, it is checked whether it is the end of paper discharge or not, and if it is not the end of paper discharge, then it is checked whether the paper discharge check counter CEXIT is "0" or not. If it is not "0", then it immediately returns to the main routine. On the other hand, if it is "0", since it indicates the fact that paper discharge has not been completed within a predetermined time period, a paper discharge error process is carried out and then it returns to the main routine. If it is the end of paper discharge, then the paper discharge flag is turned off and it returns to the main routine after transferring a command which indicates the end of paper discharge and the print data No. of the paper thus discharged to the image process controller 1.

In this manner, in the present image process apparatus, there is provided a function for transferring an image formation start signal added with management number information to the associated image forming apparatus and the image forming apparatus returns the management number information for the sheet of paper whose paper discharge operation has been completed at the time of completion of paper discharge operation. Thus, the management of paper discharge can be carried out accurately and a complicated paper jam back-up process can be carried out easily.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the inventions, which is defined by the appended claims.

What is claimed is:

1. A lateral registration adjusting device for use in an optical writing system, comprising:
   means for supplying a sheet of recording paper to a recording station through a predetermined transportation path;
   correction value setting means for setting a discrepancy between a position of said sheet of recording paper at said recording station and a predetermined reference position in a lateral direction transverse to a direction of transportation as a correction value;
   sync detecting means for detecting the timing of a scan line for optical writing by said optical writing system;
   counter means for determining a record start position in said lateral direction using a sync detection pulse output from said sync detecting means as a reference; and
   record start point correcting means for controlling a count of said counter means so as to correct said record start point in said lateral direction based on an output from said correction value setting means.

2. The device of claim 1 wherein said supplying means includes a plurality of paper feeding units and said correction value setting means includes a plurality of correction value setting units for correcting respective discrepancies of said plurality of paper feeding units, whereby said record start point of an image is controlled individually for each of said plurality of paper feeding units.

* * * * *